US011840790B2

(12) United States Patent
Park et al.

(10) Patent No.: US 11,840,790 B2
(45) Date of Patent: Dec. 12, 2023

(54) WASHING MACHINE AND METHOD FOR OPERATING WASHING MACHINE

(71) Applicant: LG Electronics Inc., Seoul (KR)

(72) Inventors: Miyoung Park, Seoul (KR); Soyeon Ko, Seoul (KR); Yoomee Song, Seoul (KR); Mijin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 561 days.

(21) Appl. No.: 16/957,448

(22) PCT Filed: Dec. 4, 2018

(86) PCT No.: PCT/KR2018/015260
§ 371 (c)(1),
(2) Date: Jun. 24, 2020

(87) PCT Pub. No.: WO2019/132284
PCT Pub. Date: Jul. 4, 2019

(65) Prior Publication Data
US 2020/0362497 A1 Nov. 19, 2020

(30) Foreign Application Priority Data
Dec. 29, 2017 (KR) ........................ 10-2017-0184683

(51) Int. Cl.
*D06F 34/32* (2020.01)
*D06F 33/32* (2020.01)
(Continued)

(52) U.S. Cl.
CPC .............. *D06F 34/32* (2020.02); *D06F 33/32* (2020.02); *G10L 15/22* (2013.01); *D06F 25/00* (2013.01);
(Continued)

(58) Field of Classification Search
CPC .......... D06F 33/00; D06F 33/32; D06F 34/00; D06F 34/28; D06F 34/32; D06F 2101/00;
(Continued)

(56) References Cited

U.S. PATENT DOCUMENTS

2009/0006970 A1 1/2009 Jeffery et al.
2013/0290902 A1* 10/2013 Martin .................. G06F 3/0485
715/830

(Continued)

FOREIGN PATENT DOCUMENTS

JP 2016022347 2/2016
KR 20140086457 7/2014

(Continued)

OTHER PUBLICATIONS

Extended European Search Report in European Appln. No. 18897041.2, dated Aug. 5, 2021, 6 pages.

(Continued)

*Primary Examiner* — David G Cormier
(74) *Attorney, Agent, or Firm* — Fish & Richardson P.C.

(57) ABSTRACT

A washing machine includes: a washing tub; a speech reception unit configured to receive speech information; a communication unit activated by starting words input by a user, so as to communicate with a server for providing washing-related information; a touch screen for outputting graphic objects corresponding to washing-related functions which can be performed by the washing tub; and a control unit for controlling the touch screen such that when the user's proximity is sensed, a first graphic object is output to the touch screen, and in response to the input starting words, the first graphic object is switched to a second graphic object indicating that a speech recognition function is activated. In addition, in response to reception of laundry-related speech information, the control unit analyzes the received speech (Continued)

information and outputs, on the basis of the analysis result, feedback sound associated with washing of the corresponding laundry.

19 Claims, 17 Drawing Sheets

(51) Int. Cl.
*G10L 15/22* (2006.01)
*D06F 101/02* (2020.01)
*D06F 101/20* (2020.01)
*D06F 34/05* (2020.01)
*D06F 101/00* (2020.01)
*D06F 25/00* (2006.01)
*D06F 39/00* (2020.01)

(52) U.S. Cl.
CPC .............. *D06F 34/05* (2020.02); *D06F 39/00* (2013.01); *D06F 2101/00* (2020.02); *D06F 2101/02* (2020.02); *D06F 2101/20* (2020.02); *G10L 2015/225* (2013.01)

(58) Field of Classification Search
CPC ............. D06F 2101/02; D06F 2101/04; D06F 2101/06; D06F 2101/10; D06F 2101/12; D06F 2101/14; D06F 2101/16; D06F 2101/18; D06F 2101/20; G10L 15/22; G10L 2015/225
See application file for complete search history.

(56) References Cited

U.S. PATENT DOCUMENTS

| | | | |
|---|---|---|---|
| 2014/0058553 A1* | 2/2014 | Lee | D06F 37/42 700/143 |
| 2015/0198940 A1* | 7/2015 | Hwang | G05B 15/02 700/90 |
| 2015/0345065 A1 | 12/2015 | Yang et al. | |
| 2016/0024703 A1* | 1/2016 | Blancuzzi | D06F 29/00 68/19 |
| 2018/0096690 A1* | 4/2018 | Mixter | G10L 21/0216 |
| 2020/0365150 A1* | 11/2020 | Jeon | G06F 11/3013 |

FOREIGN PATENT DOCUMENTS

| | | |
|---|---|---|
| KR | 20140095779 | 8/2014 |
| KR | 20150032100 | 3/2015 |
| KR | 20150105844 | 9/2015 |
| KR | 20170082060 | 7/2017 |
| WO | WO2015055239 | 4/2015 |

OTHER PUBLICATIONS

Office Action in Korean Appln. No. 10-2017-0184683, dated Dec. 5, 2021, 13 pages (with English translation).

* cited by examiner

FIG. 5A
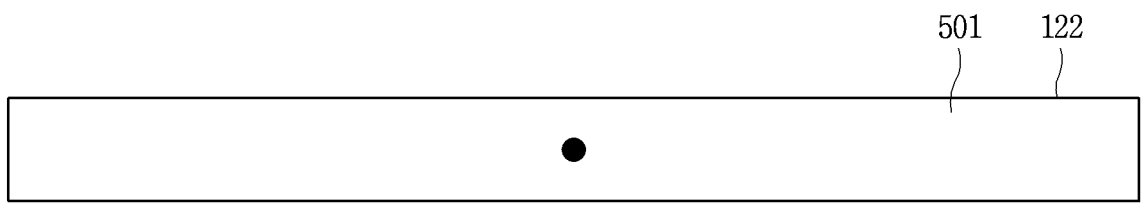
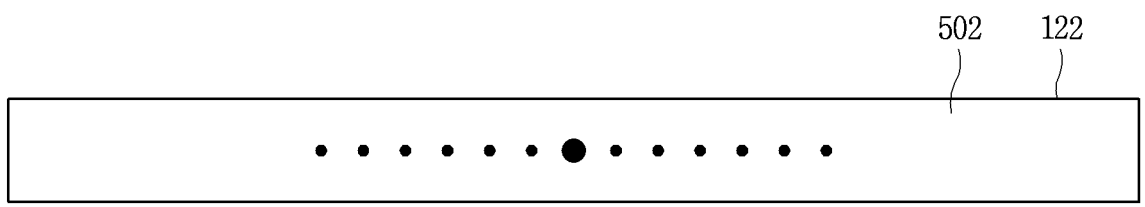
FIG. 5B

FIG. 6D
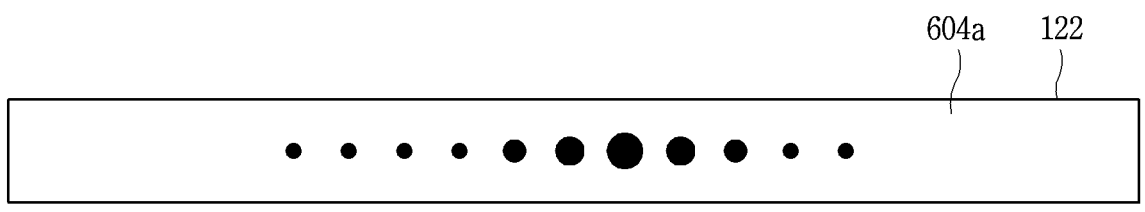
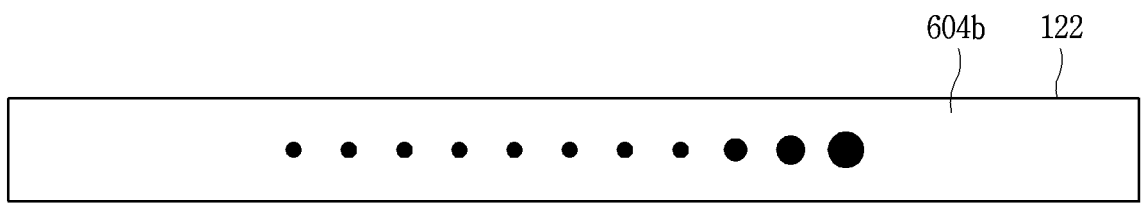

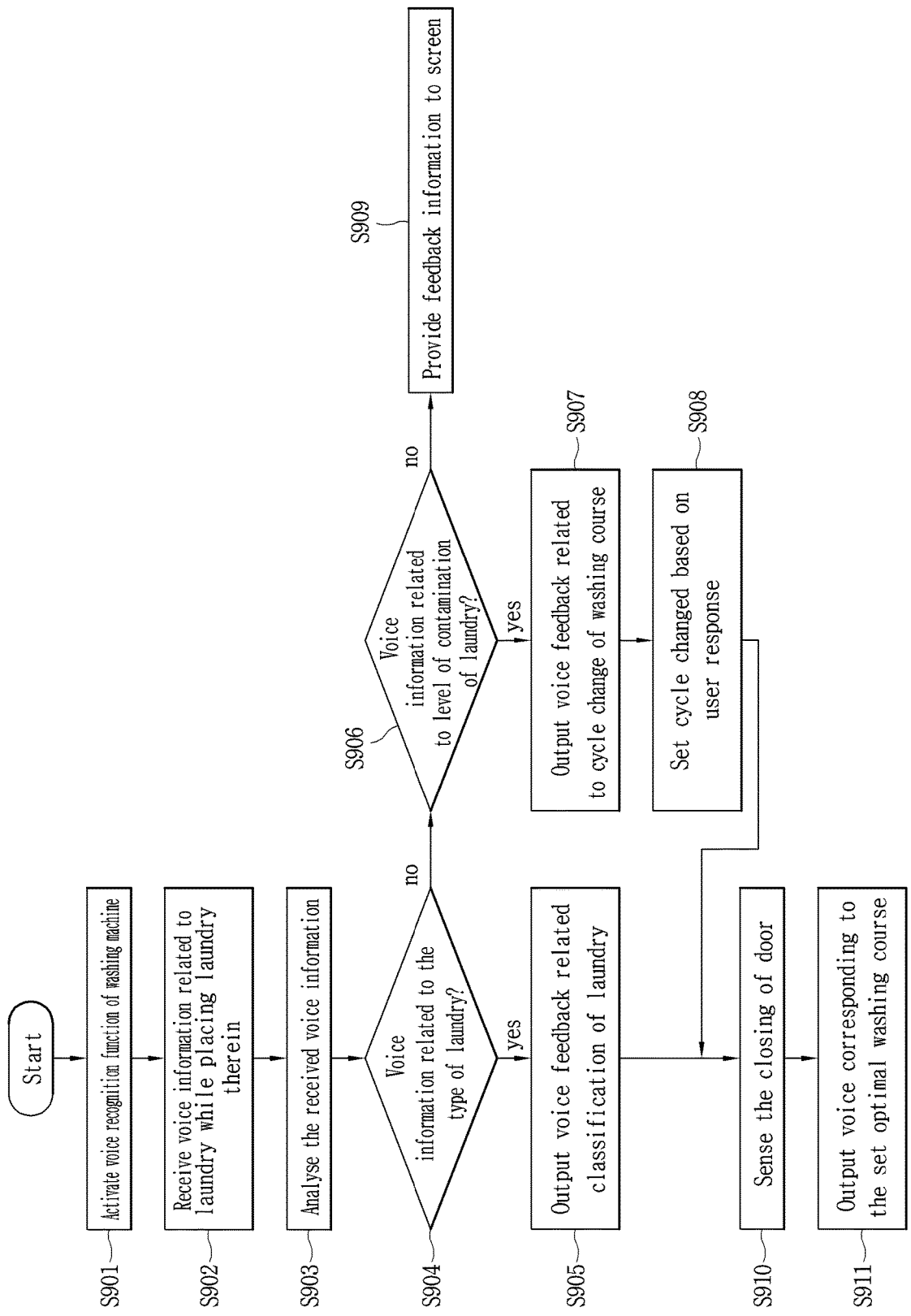

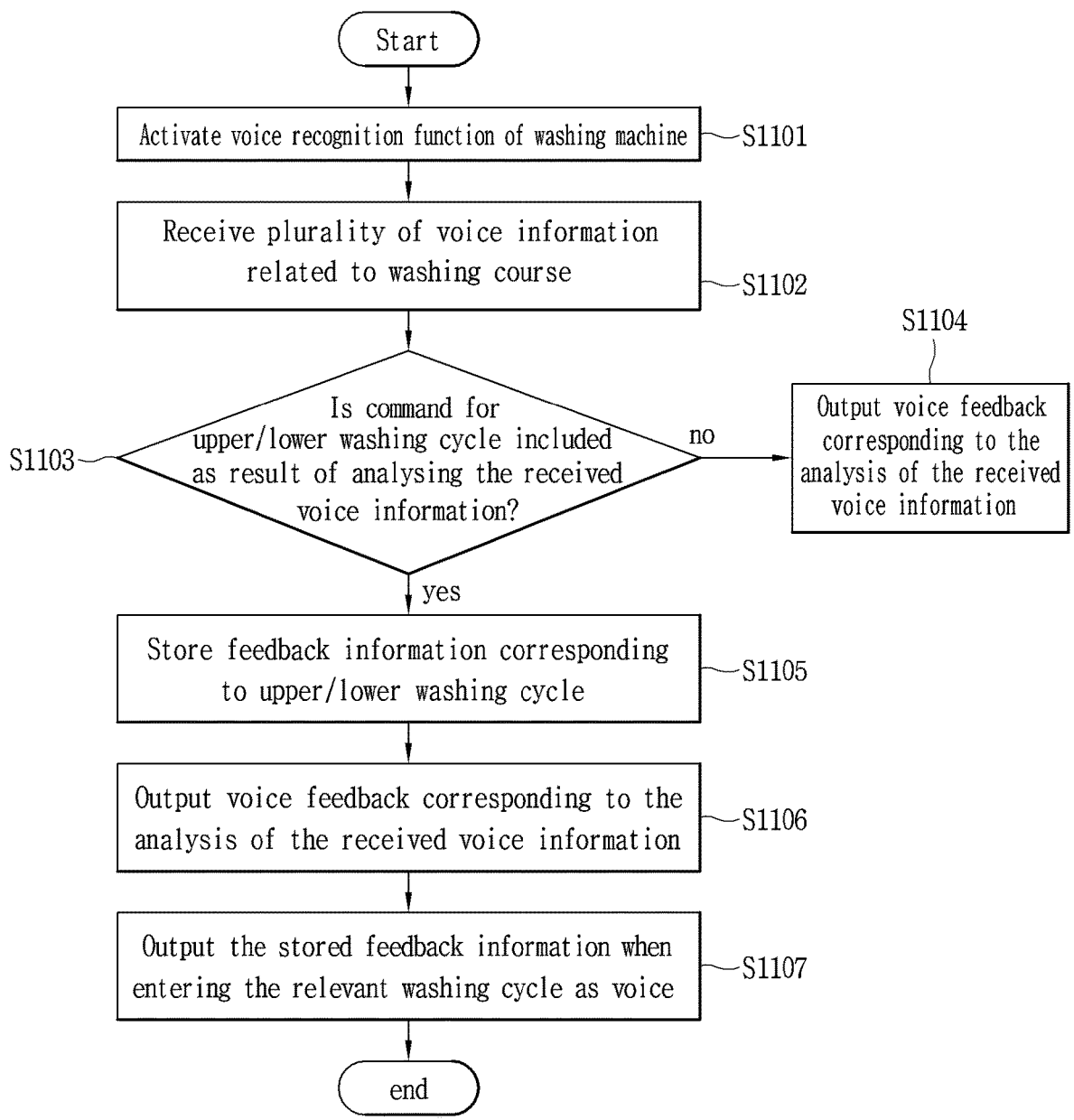

WASHING MACHINE AND METHOD FOR OPERATING WASHING MACHINE

CROSS-REFERENCE TO RELATED APPLICATIONS

This application is a National Stage application under 35 U.S.C. § 371 of International Application No. PCT/KR2018/015260, filed on Dec. 4, 2018, which claims the benefit of Korean Application No. 10-2017-0184683, filed on Dec. 29, 2017. The disclosures of the prior applications are incorporated by reference in their entirety.

BACKGROUND

1. Technical Field

The present disclosure relates to a washing machine capable of recognizing a user's voice and a method operating the washing machine.

2. Description of the Related Art

A washing machine includes all of a device for washing clothes, a dryer for drying clothes, and a device capable of washing and drying clothes together. Washing of clothes is a process of removing contaminants adhering to laundry through the action of water and detergent, and drying of clothes is a process of removing moisture contained in clothes through, for example, a hot air supply device. Furthermore, in recent years, a refresher for refreshing clothes using hot air or steam other than washing with water has been released, and the refresher may also be referred to as a washing machine. In addition, a dishwasher for washing dishes, but not clothes, may also be referred to as a washing machine in a broad sense, and a washing machine referred to herein includes all of the foregoing various devices.

A typical washing machine includes a control unit that displays visual information related to a cycle processed in the washing machine and receives a user's manipulation. Such a control unit is typically provided in a washing machine body, and provided with a plurality of buttons or knobs for simply displaying and manipulating only a predetermined cycle in an on/off manner. In recent years, research has been actively conducted to implement a control unit as a touch screen by focusing on the simple appearance of a washing machine.

However, in any case, there still exists an inconvenience in that the user has to directly perform a push input or touch input, and there is a limit restricted to only command inputs corresponding to buttons or icons presented on the control unit or the touch screen. Moreover, there still exists an inconvenience in that such a command input is limited to a function executable in a current washing step, or the operations of the control unit must be performed several times or washing must be stopped in order to enter a desired step. Such a method is a barrier to performing a more direct and efficient interaction between the washing machine and the user.

SUMMARY

Accordingly, an aspect of the present disclosure is to provide a washing machine capable of performing a voice interaction related to laundry and an operating method thereof while placing laundry therein in consideration of the characteristics of the washing machine in which the laundry must be directly placed by a user.

Furthermore, another aspect of the present disclosure is to provide a washing machine and an operation method thereof capable of automatically setting an optimal washing course based on a voice interaction related to laundry.

In addition, still another aspect of the present disclosure is provide a washing machine and an operation method thereof capable of remembering a user's voice command even when the voice command that is not related to a current laundry course is input, and then automatically executing a function when entering the relevant laundry course or when taking out laundry.

Accordingly, in order to solve the foregoing problems, a washing machine according to an embodiment of the present disclosure may include a washing tub: a voice receiver configured to receive voice information; a communication unit activated by a starting phrase input to communicate with a server that provides washing-related information; a touch screen that outputs a graphic object corresponding to a washing-related function executable by the washing tub; and a control unit that senses a user's proximity to display a first graphic object on the touch screen, and controls the touch screen to switch the first graphic object to a second graphic object indicating that a voice recognition function is activated in response to the input of the starting phrase, wherein the control unit analyzes the received voice information in response to receiving the voice information related to laundry, and outputs feedback voice related to washing of the relevant laundry based on the analysis result.

Furthermore, according to an embodiment, information related to the laundry may include input information or inquiry information on at least one of a type of laundry, a degree of contamination, a washing method, and a decontamination method, and information related to washing of the laundry may include answer information on at least one of whether to be separately washed, a method of washing laundry, a handling precaution, whether to change the cycle according to a degree of contamination, and a decontamination method.

Furthermore, according to an embodiment, the control unit may analyze the voice of the user who inputs the starting phrase to generate response voice including matching user information, and switch the second graphic object to a third graphic object corresponding to a washing-related function when the generated response voice is output.

Furthermore, according to an embodiment, the voice receiver may be switched to a standby mode while the feedback voice related to washing of laundry is output, and the output of the feedback voice may be stopped to switch the standby mode to an execution mode when voice information is received while the feedback voice is output.

Furthermore, according to an embodiment, a type of laundry may be extracted as a keyword in response to receiving voice information including the type of laundry, and the keyword may be displayed in the form of dictation on the touch screen while the extracted keyword is output as voice.

Furthermore, according to an embodiment, the control unit may receive laundry-related information matching the keyword from the server, and generate feedback information related to washing of the relevant laundry based on the received laundry-related information and the received voice information.

Furthermore, according to an embodiment, the control unit may determine whether the relevant laundry is laundry to be separately washed based on the analysis of voice information related to laundry received at a first time point and voice information received at a second time point after the elapse of the first time point, and output different voice feedback according to the determination.

Furthermore, according to an embodiment, the control unit may set individual washing cycles based on the analysis of voice information related to laundry, and output feedback voice for guiding the set individual cycles when a washing start command is input.

Furthermore, according to an embodiment, a plurality of icons corresponding to different types of laundry may be displayed on the touch screen, and the control unit may recognize a type of laundry corresponding to a touched icon in response to a touch applied to at least one of the plurality of icons being dragged to a predetermined region of the touch screen, and change the washing cycle including the recognized type of laundry.

Furthermore, according to an embodiment, when voice information related to the received laundry is information in the form of a query about the type or contamination of the laundry, the control unit may trigger to capture a laundry image using a camera provided in the washing machine or an external terminal connected thereto, and transmit the acquired laundry image to the server to receive information related to washing of the laundry.

Furthermore, according to an embodiment, the control unit may determine a degree of contamination of laundry based on the analysis of voice information related to the laundry, and output voice feedback related to a change of the washing cycle based on the determined degree of contamination.

Furthermore, according to an embodiment, the control unit may generate a washing start command with the changed washing cycle based on a user response to the output voice feedback.

Furthermore, according to an embodiment, first voice that guides the set washing cycle and second voice that informs that washing is started with the set washing cycle may be sequentially output based on voice information related to laundry when the closing of the washing machine door is sensed.

Furthermore, according to an embodiment, when the closing of the washing machine door is sensed while feedback voice related to washing of laundry is output, the control unit may control to stop outputting the feedback voice and output the first voice.

Furthermore, according to an embodiment, the washing machine may further include a memory for storing the input voice memo while washing is in progress, wherein the control unit outputs the stored voice memo in the form of a voice prompt in response to sensing the opening of the washing machine door subsequent to the completion of washing.

A method of operating a washing machine according to an embodiment of the present disclosure is a method of operating a washing machine having a touch screen and capable of receiving voice information, and the method may include sensing a user's proximity to display a first graphic object on the touch screen; connecting a server providing washing-related information in a communicable manner by a starting phrase input to display a second graphic object indicating that a voice recognition function is activated on the touch screen; receiving voice information related to laundry; and analyzing the received voice information to output feedback voice related to washing of the relevant laundry.

As described above, according to a washing machine and an operation method of the washing machine in accordance with an embodiment of the present disclosure, a voice interaction related to laundry may be performed while placing the laundry therein, in consideration of the characteristics of the washing machine in which the laundry must be directly placed by a user. Furthermore, an optimal laundry course may be automatically set based on a voice interaction related to laundry to perform the initiation of washing more quickly. In addition, a washing machine and an operation method thereof capable of remembering a user's voice even when the voice command is input regardless of the progress of a current washing course, and then automatically executing a function when entering the relevant washing course or taking out laundry.

BRIEF DESCRIPTION OF THE DRAWINGS

FIGS. 5A, 5B, 6A, 6B, 6C, and 6D are views illustrating an example of various screen changes of a touch screen according to a voice recognition state in a washing machine according to an embodiment of the present disclosure.

FIG. 9 is an exemplary flowchart for explaining a process of providing a different feedback according to an analysis of received voice information in a washing machine according to an embodiment of the present disclosure and in a washing machine.

FIG. 11 is a flowchart for explaining a process in the case where a plurality of voice information for different washing steps are received in a washing machine according to an embodiment of the present disclosure.

DETAILED DESCRIPTION OF THE EMBODIMENTS

Hereinafter, a washing machine associated with a preferred embodiment of the present disclosure will be described in detail with reference to the accompanying drawings.

Unless clearly used otherwise, expressions in the singular number may include a plural meaning.

It will be understood that, although the terms first, second, etc. may be used herein to describe various elements, these elements should not be limited by these terms. The terms are used merely for the purpose to distinguish an element from the other element.

Components that are the same as or similar to the foregoing embodiments are designated with the same numeral references even in different embodiments and their redundant description will be omitted.

In describing the embodiments disclosed herein, moreover, the detailed description will be omitted when a specific description for publicly known technologies to which the invention pertains is judged to obscure the gist of the present invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
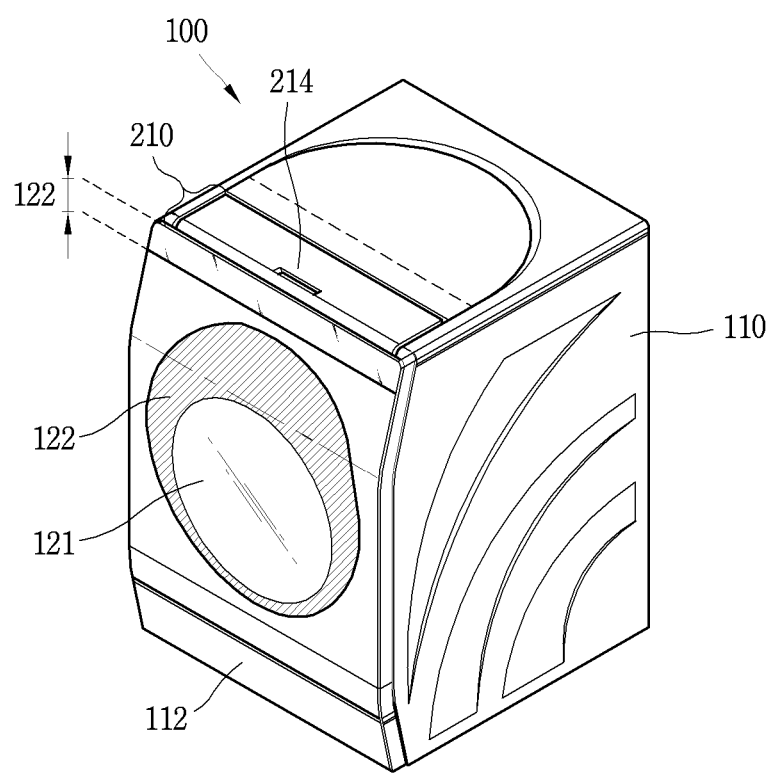
FIG. 1A is a perspective view illustrating a washing machine according to an embodiment of the present disclosure.
Figure 1B:
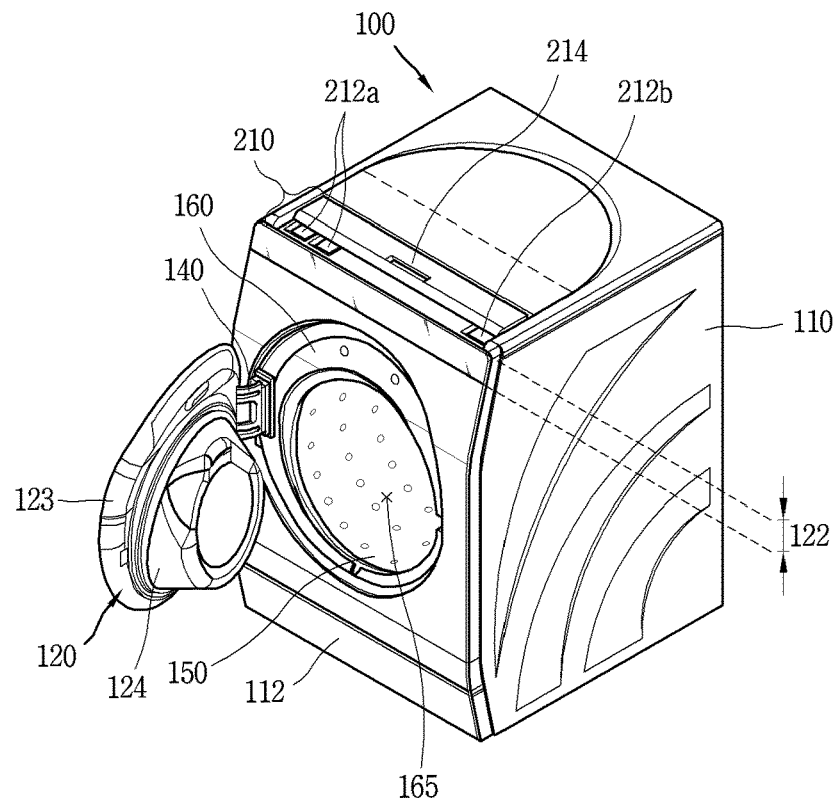
FIGS. 1B and 1C are conceptual views illustrating a degree of opening and closing of a door of a washing machine according to an embodiment of the present disclosure.
Figure 1C:
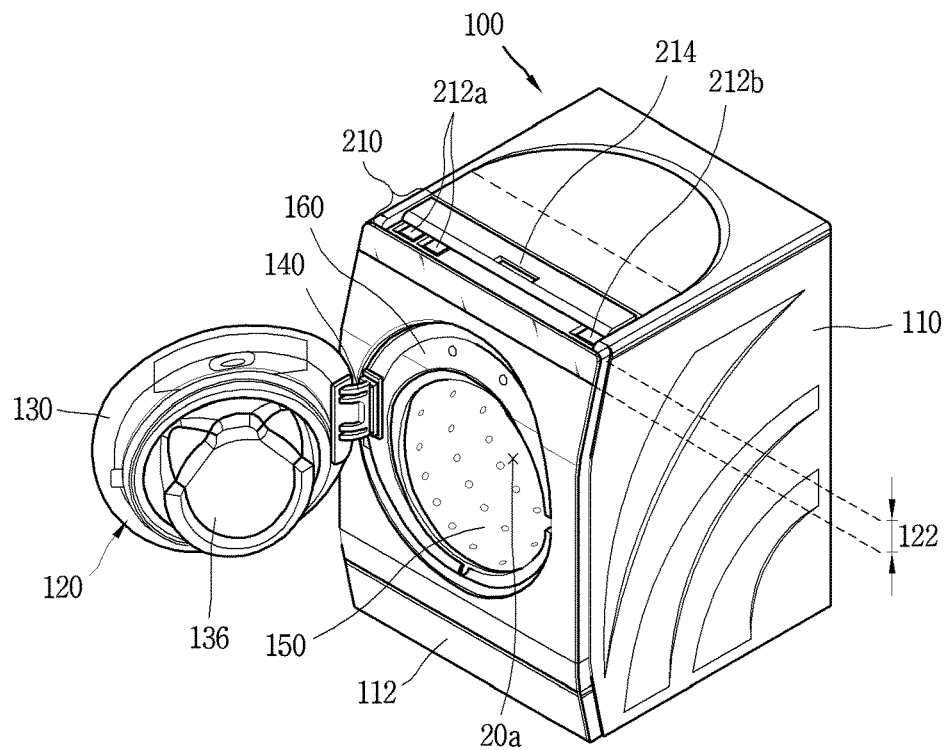

FIG. 1A is a perspective view showing a washing machine 100 according to an embodiment of the present disclosure, and FIGS. 1B and 1C are conceptual views showing a state in which a door 120 illustrated in FIG. 1A is rotated primarily and secondarily, respectively, to open a laundry inlet port 160a and slide a detergent supply unit 210 in a predetermined direction to be open.

Referring to the present drawings, the washing machine 100 includes a main body 110 and a door 120.

The main body 110 defines an outer shape of the washing machine 100, and includes a laundry inlet port 165 through which laundry is input. In the present embodiment, it is shown that the laundry inlet port 165 is disposed on a front surface portion of the main body 110 having a hexahedral shape.

An inside of the main body 110 is provided with a laundry accommodating portion for accommodating laundry through the laundry inlet port 165. The laundry accommodating portion may be referred to as a "washing tub."

For an example, when the washing machine 100 of the present disclosure is configured as a device for drying laundry, the laundry accommodating portion may be configured as a drum 150 rotatably provided inside the main body 110.

For another example, when the washing machine 100 of the present disclosure is configured as a device capable of washing and drying laundry together, a laundry accommodating portion may include a tub (not shown) provided inside the main body 110 to store wash water and a drum 150 rotatably provided inside the tub to accommodate laundry.

The main body 110 is provided with a drive unit (not shown) configured to rotate the drum 150. The drive unit may include a motor that generates a driving force and a belt that rotates the drum 150 using the driving force. The drum 150 is rotated with a rotational force according to the rotation of the motor, for example, when sensing the weight of the laundry, during the washing cycle, during the rinsing cycle, during the dehydration cycle, to wash, rinse and dehydrate laundry accommodated in the drum 150. In addition, although not shown, the main body 110 is provided with a water supply device including a water pipe and a water inlet valve to supply water. Here, one end of the water pipe is connected to an external water pipe (not shown), and the other end thereof is connected to a washing tub to receive water from the external water pipe and guide laundry detergent accommodated in a storage container of a detergent supply unit together with water into the drum 150. Moreover, the water inlet valve is opened and closed during the washing and rinsing cycles to control the supply of water into the drum 150.

Meanwhile, a touch screen 122 may be provided on an upper front portion of the main body 110. In this case, it may be configured to turn on or off the power of the washing machine 100 through a touch input to the touch screen 122. In this case, a power button is not provided thereon to implement a simpler appearance. The touch screen 122 will be described in more detail below.

In addition, a detergent supply unit 210 may be provided on an upper surface of the main body 110 to be slidable in a vertical direction. To this end, a handle 214 may be provided on the upper surface of the main body 110 to facilitate sliding and movement of the detergent supply unit 210 upward and downward. Laundry detergent and softener may be added and stored inside the laundry detergent supply unit 210. Laundry detergent includes both liquid and powder forms, and includes all substances that enhance the washing effect of laundry, such as fabric detergent and fabric bleach. Furthermore, referring to FIGS. 1B and 1C, the detergent supply unit 210 includes a storage container composed of a detergent accommodating unit 212a in which laundry detergent is accommodated and a softener accommodating unit 212b in which liquid softener is accommodated. In addition, the detergent supply unit 210 may include a laundry detergent supply passage (not shown) configured to supply laundry detergent and liquid softener accommodated in the storage container to the washing tub and a laundry detergent pump (not shown) provided in the laundry detergent supply passage.

A door 120 is rotatably provided with respect to the main body 110 by a hinge unit 140, and is configured to open and close the laundry inlet port 165. As illustrated, the main body 110 may be recessed inward from an outer surface thereof, and may include a door accommodating portion 160 having a laundry inlet port 165 therein. While the door 120 is closed, the door 120 is accommodated in the door accommodating portion 160, and an outer edge portion of the door 120 is disposed to have the same plane as an outer surface of the main body 110 adjacent thereto.

As such, due to a structure in which the door 120 is accommodated in the door accommodating portion 160, in order to prevent the door 120 from being caught by the main body 110 while opening the door 120, a hinge unit 140 may have a double hinge structure having two different rotating shafts. In this case, as illustrated in FIGS. 1B and 1C, the hinge unit 140 may be configured such that the door 120 is separated from the door accommodating portion 160 by primary rotation about any one rotating shaft, and then rotated by secondary rotation about the other rotating shaft.

In a structure in which the hinge unit 140 is mounted on one side of the door 120, a locking device for fixing or releasing the door 120 to or from the main body 110 is provided on the other side of the door 120. The locking device may be configured in a press type to lock the door 120 when the other side of the door 120 is pressed once, and unlock the door 120 when pressed once again.

A window 121 is provided on the door 120. Furthermore, a second touch screen (not shown) may be provided in part of the window 121 or a region of the door 120 out of the window 121.

While the door 120 is closed, the window 121 is disposed to correspond to the laundry inlet port 165, and configured to look into the laundry accommodating portion. Accordingly, the user may check the state of laundry accommodated in the laundry accommodating portion through the window 121.

The touch screen 122 displays (outputs) information processed by the washing machine 100. For example, the touch screen 122 may display execution screen information of a cycle (washing, dehydration, drying cycles, etc.) driven by the washing machine 100 or user interface (UI) or graphic user interface (GUI) information corresponding to the execution screen information.

The touch screen 122 is illustrated as being provided on an upper front portion of the main body, but is not limited thereto. For example, the touch screen 122 may be provided at any position of a side surface, a lower portion of the main body, or a side surface of the window 121 or the door 120, and may also be provided at a plurality of positions.

Figure 1D:
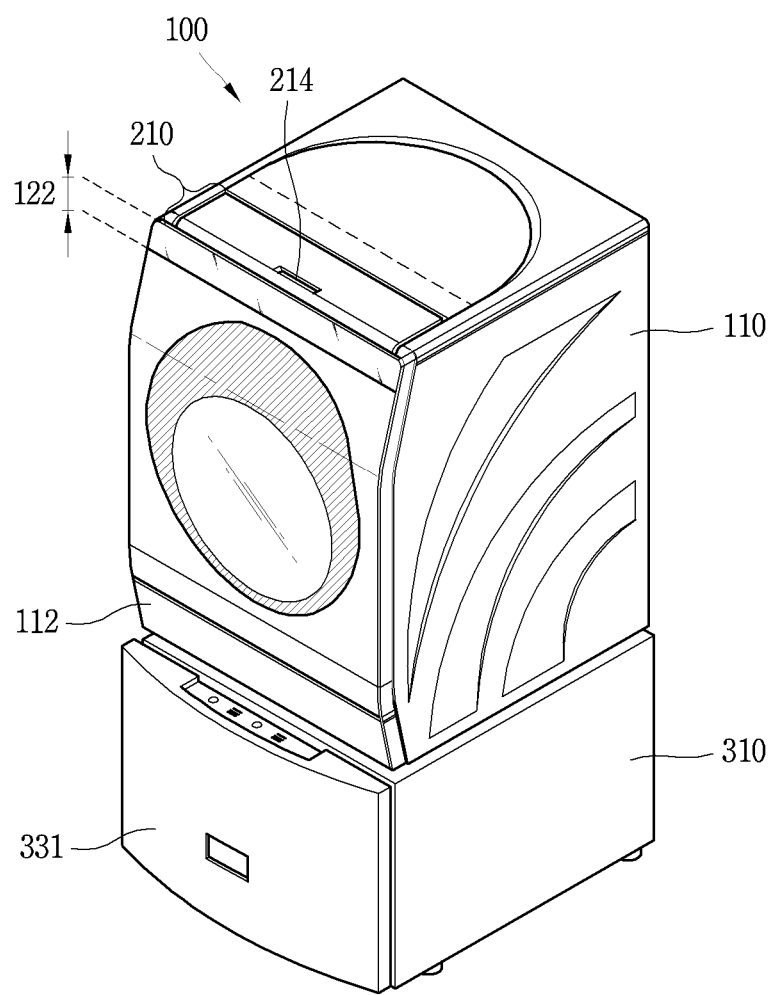
FIG. 1D is a perspective view illustrating a washing machine according to another embodiment of the present disclosure.

On the other hand, the washing machine 100 according to an embodiment of the present disclosure may be configured with a structure including an auxiliary washing device at a lower portion or at one side of the main body 110, as illustrated in FIG. 1D. The washing machine 100 of FIG. 1D may include a first cabinet 110 defining an outer shape of a main washing device and a second cabinet 310 defining an outer shape of the auxiliary washing device. At this time, the first cabinet 110 and the second cabinet 310 may be integrally formed.

In addition, the auxiliary washing device may exist in various forms. For an example, it may be defined of a top-loading type washing device, or may have the same structure or a different structure as or from the main washing device. In addition, the auxiliary washing device may be configured to be provided such that at least one of the washing capacity, volume, and height is smaller than the main washing device. Accordingly, the user may appropriately and selectively use at least one of the main washing device and the auxiliary washing device according to the amount of laundry. Furthermore, the user may select at least one of the main washing device and the auxiliary washing device according to the type of laundry.

In addition, the auxiliary washing device may include a second cabinet defining an appearance, a drawer housing configured to be drawn into or drawn out of the second cabinet 310, and a second washing tub provided inside the drawer housing. Here, the drawer housing may be drawn into the second cabinet 310 or drawn out of the second cabinet 310 through an opening portion disposed in the second cabinet 310 toward a forward direction of the auxiliary washing device or may be withdrawn from the second cabinet 310.

Furthermore, a cover panel 331 may be provided in front of the drawer housing. The cover panel 331 may be integrally formed with the drawer housing. Also, a handle for drawing a drawer housing thereinto or out thereof may be disposed on the cover panel 331. In addition, a control panel for operating the auxiliary washing device may be provided on an upper surface of the cover panel 331.

The touch screen 122 may function as a user input unit that provides an input interface between the washing machine 100 and the user, and at the same time, provide an output interface between the washing machine 100 and the user. For example, selection and change of an operation mode for performing washing, dehydration, drying cycles, and the like, may be implemented using a user's touch input (or touch) on the touch screen 122.

The touch screen 122 is provided with a touch sensor to sense a touch input.

The touch sensor detects a touch input applied to the touch screen 122 using at least one of various touch methods such as a resistive film method, a capacitive method, an infrared method, an ultrasonic method, and a magnetic field method.

For an example, the touch sensor may be configured to convert a change in pressure applied to a specific portion of the touch screen 122 or capacitance generated in the specific portion into an electrical input signal. The touch sensor may be configured to detect a location, area of a touch object that applies a touch on the touch screen 122 is touched on the touch screen 122, a pressure during the touch, and the like. Here, the touch object is an object that applies a touch to the touch screen 122, and may be, for example, a finger, a touch pen or a stylus pen, a pointer, and the like.

As such, when there is a touch input to the touch screen 122, a signal (signals) corresponding thereto is sent to the controller. The controller processes the signal(s) and then transmits data thereto to a control unit 180 (see FIG. 3). Accordingly, the control unit 180 may know which region of the touch screen 122 has been touched. Here, the controller may be a separate configuration from the control unit 180, or may be the control unit 180 itself. In some examples, the control unit 180 may include an electric circuit, an integrated circuit, or one or more processors such as a microprocessor.

Meanwhile, the control unit 180 may perform different controls or perform the same control according to the type of the touch object that touches the touch screen 122. Whether to perform different control or the same control according to the type of the touch object may be determined according to an operating state of the washing machine 100 or an application program being executed.

The touch screen 122 may sense various types of touches, such as a short (or tap) touch, a long touch, a multi touch, a drag touch, a flick touch, a pinch-in touch, a pinch-out touch, a swype touch, a hovering touch, and the like.

Meanwhile, the washing machine according to the present disclosure may recognize a voice, and execute a voice recognition function that controls the operation of the washing machine based on the recognized voice. The voice recognition function is a function capable of controlling the operation of a device, for example, a washing machine, through voice, and may include a natural language analysis function that analyzes natural languages, a question and answer function that provides answers to questions, a voice processing function that converts digital voice signals into a language that can be processed by a computer, an automatic interpretation and translation function that converts voice into multiple languages, and the like.

The washing machine according to the present disclosure may be set to either one of a standby state or a voice recognition state, depending on whether the voice recognition function is executed.

The standby state denotes a state of sensing whether voice related to the execution of the voice recognition function is present around the washing machine prior to executing the voice recognition function. To this end, the control unit 180 of the washing machine 100 may continuously observe (or monitor) whether or not sound above a specific loudness is sensed through a microphone even in the standby state.

Since voice analysis is not performed in the standby state, only low power, for example, a current of about 4.4 mA may be consumed. This standby state may also be referred to as a "listening phase".

The control unit 180 of the washing machine may be switched from the standby state to the voice recognition state when sound above a specific loudness determined in the standby state is sensed. In addition, as will be described in more detail below, the voice recognition state may be switched back to the standby state while the washing machine utters, that is, while the washing machine outputs a feedback voice. However, even in this case, when the user's voice is received (even if it is not a starting phrase), it is immediately switched to the voice recognition state.

Figure 2:
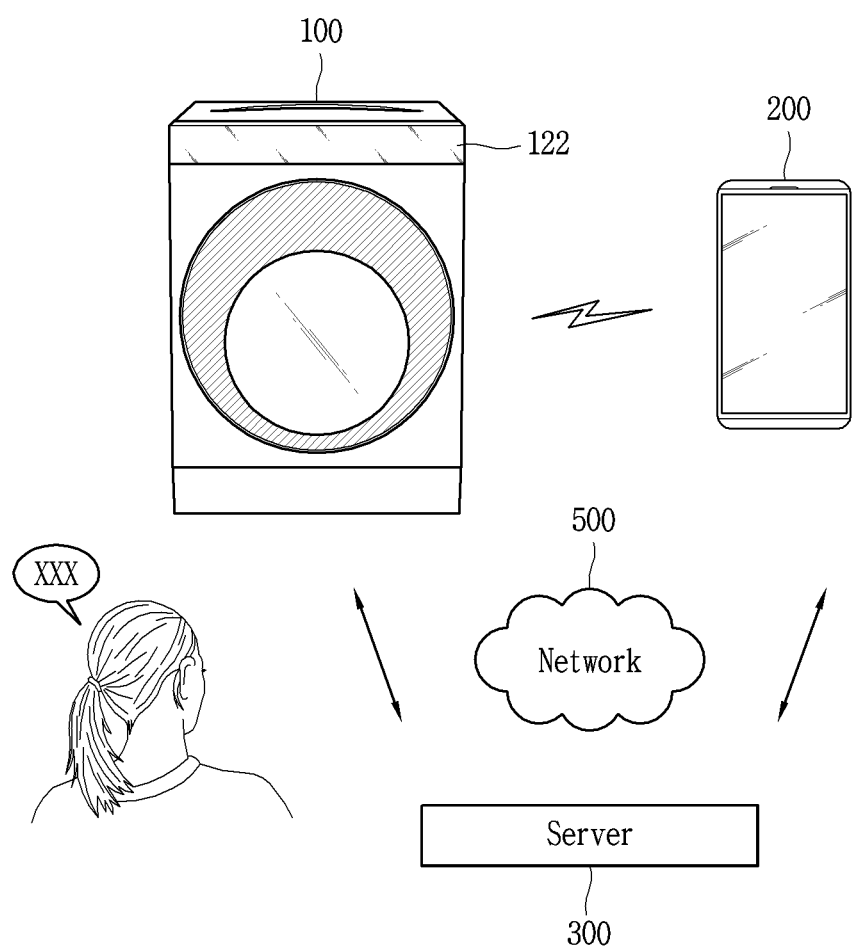
FIG. 2 is a view for explaining an environment in which a washing machine according to an embodiment of the present disclosure communicates with an external terminal and a server.

FIG. 2 is a view for explaining an environment in which a washing machine capable of executing a voice recognition function as described above communicates with an external terminal and a server. As illustrated in FIG. 2, the washing machine 100 according to the present disclosure may communicate with an external terminal 200 and a server ("artificial intelligence server") 300 that provides washing-related information. To this end, the washing machine 100 may have a unique device ID, and when registered with the server 300 through a unique device ID, the washing machine 100 may receive various information and services from the server 300.

The external terminal 200 may include a mobile terminal such as a mobile phone, a smart phone, a laptop, a computer, but is not limited thereto, and may also include a stationary terminal.

The server 300 performs remote management services for household appliances including a washing machine. The server 300 may generate a control command based on washing-related information and transmit it to the washing machine 100 or the external terminal 200 paired with the washing machine 100 to control the operation of the washing machine.

In addition, the washing machine 100 may include a short-range wireless communication module, such as a Wi-Fi communication module, a Zigbee communication module, to communicate with the server 300 and the network 500. Alternatively, the washing machine 100 may be applied with a wireless Internet module to communicate with the server 300 through an Internet network 500 through an AP (Access Point).

In one example, while the voice recognition function of the washing machine 100 is in an execution state, the received user's voice information of the washing machine 100 may be transmitted to the server 300 through the network 500 and an analysis result may be received from the server 300, and then outputted through the washing machine 100. Alternatively, voice feedback described herein may be generated by combining washing-related information received from the server 300 and a voice analysis result of the washing machine 100 itself.

Figure 3:
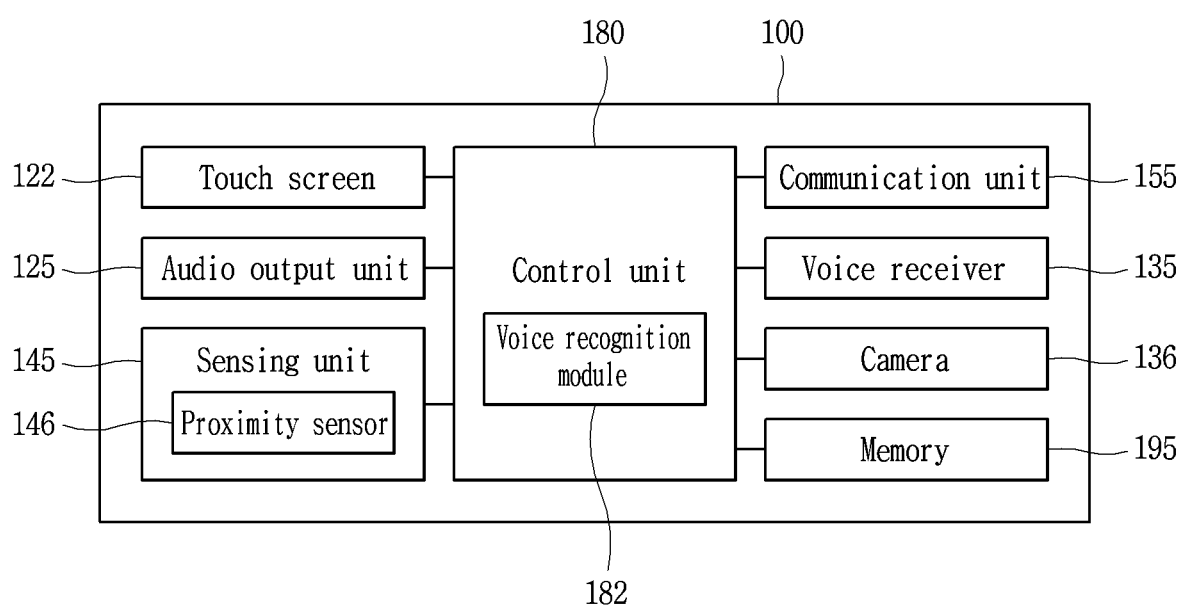
FIG. 3 is an exemplary block diagram for explaining the configuration of a washing machine according to an embodiment of the present disclosure.

Hereinafter, FIG. 3 is an exemplary block diagram for explaining the detailed configuration of the washing machine 100 according to the embodiment of the present disclosure described above.

As illustrated in FIG. 3, the washing machine 100 may further include a control unit 180 including a voice recognition module, a communication unit or device 155, an audio output unit 125, a sensing unit 145, a voice receiver 135, a camera 136, and a memory 195 in addition to the touch screen 122 described above.

Specifically, the communication unit 155 may support short-range communication using at least one of Bluetooth™, RFID (Radio Frequency Identification), infrared communication (Infrared Data Association; IrDA), UWB (Ultra Wideband), ZigBee, NFC (Near Field Communication), Wi-Fi (Wireless-Fidelity), Wi-Fi Direct, and Wireless Universal Serial Bus (USB) technologies. For an example, in response to the proximity of a user terminal registered with the main body of the washing machine 100, the washing machine 100 and the user terminal may perform wireless data communication using Bluetooth communication. Here, the user terminal may include, for example, a smart phone, a tablet, a laptop, an ultrabook, a wearable device, a watch type terminal, and the like.

The control unit 180 controls overall operations related to the driving of the washing machine 100. In addition, the control unit 180 may control the operation of each component provided in the washing machine 100 to process signals generated therefrom.

The audio output unit 125 may be configured to output a predetermined notification sound or voice when an event related to washing occurs. Here, the event related to washing may denote connection to an external device, power on/off, washing course setting, setting/changing of individual cycles such as rinsing, dehydration, drying, etc., initiation of washing, completion of washing, addition of laundry detergent, insufficient amount of laundry detergent, and the like. In some examples, the audio output unit 125 may include a speaker. In some examples, the audio output unit 125 may be included in the voice receiver 135.

The sensing unit 145 may include one or more sensors for sensing at least one of information in the washing machine 100, surrounding environment information around the washing machine 100, and user information. For an example, the sensing unit 145 may include a sensor configured to sense the opening and closing of the door 120, and the sensor may be disposed on one side of the door 120 or the hinge unit 140.

In addition, the sensing unit 145 may sense that a user approaches or moves away from the washing machine 100 through a proximity sensor 146. In addition, the registered user terminal may sense that the terminal approaches or moves away from the washing machine 100.

The memory 195 may store a program related to washing and information related to operations. The memory 195 may include at least one type storage medium among a flash memory type, a hard disk type, an SSD type (Solid State Disk type), an SDD type (Silicon Disk Drive type), and a multimedia card micro type, a card type memory (e.g., SD or XD memory, etc.), a random access memory (RAM), a static random access memory (SRAM), a read-only memory (ROM), an EEPROM (electrically erasable programmable read-only memory), a PROM (programmable read-only memory), a magnetic memory, a magnetic disk, and an optical disk.

Furthermore, the memory 195 may store user voice received through the voice receiver 135 or information according to the execution of a voice recognition function. In addition, the memory 195 may update setting information related to the cycles of a washing course based on a user input.

The voice recognition module 182 may analyze voice received through the voice receiver 135 through a natural language processing algorithm. Then, the voice recognition module 182 may convert the analyzed voice information into a computer-processable language. Here, the voice recognition module 182 is described as a device built in the control unit 180 or a separate device independent therefrom, but hereinafter, it is disclosed that both perform a voice recognition function through the control unit 180.

The camera 136 includes at least one of a camera sensor (e.g., CCD, CMOS, etc.), a photo sensor (or image sensor), and a laser sensor. The camera 136 and the laser sensor are combined with each other to sense a touch of a sensing object for a 3D stereoscopic image. The photo sensor may be stacked on a display element, and the photo sensor is configured to scan the movement of a sensing object in proximity to the touch screen. More specifically, the photo sensor is mounted with photo diodes and TRs (transistors) in rows and columns to scan contents placed on the photo sensor using electrical signals that change according to the amount of light applied to the photo diode. In other words, the photo sensor performs coordinate calculation of the sensing object according to the change amount of light, and through this, the location information of the sensing object may be acquired. In the present disclosure, an image of laundry is captured through the camera 136, and transmitted to the server 300 or the connected external terminal 200.

In the washing machine 100 according to the present disclosure including at least part of the above-described configuration, when the proximity of a user is sensed, a first graphic object indicating the proximity is displayed on the screen, and the voice recognition function of the washing machine 100 maintains a standby state. Then, when a predetermined starting phrase is input within a predetermined time period, the voice recognition function of the washing machine 100 is switched from the standby state to the execution state, and a second graphic object corresponding to the execution state of the voice recognition function is output on the screen. As a result, the washing machine 100 is controlled based on voice uttered by the user or becomes a state capable of receiving and analyzing voice information related to laundry, which will be described later.

Then, in response to receiving voice information related to laundry while placing laundry into the washing machine 100, the control unit 180 analyzes the relevant voice information to output feedback voice related to washing of the relevant laundry.

Here, the information related to laundry may include input information or inquiry information on at least one of a laundry type, a degree of contamination, a washing method, and a decontamination method. In addition, information related to washing of laundry, which is feedback information provided from the washing machine 100, may include answer information on at least one of whether to be separately washed, a method of washing laundry, a handling precaution, whether to change the cycle according to a degree of contamination, and a method of removing contaminants.

The user may directly utter the type of laundry while placing the laundry therein to allow the washing machine 100 to recognize it, or directly inquire whether specific laundry is water washable.

Then, when washing is started, the washing machine 100 may automatically set a suitable washing course stroke based on an analysis result of the received voice information and the output feedback voice. For example, when the user utters that "clothes are a bit dirty" while placing laundry therein, the washing machine 100 may increase a level of contamination, and accordingly increase the amount of detergent to be automatically added, increase the washing time, or set the water temperature to be high.

Alternatively, for another example, when inquiring a decontamination method, such as "I spilled coffee on a white shirt, and how can I remove it" while placing laundry therein, the washing machine may search for washing-related information from the server 300 to receive a decontamination method associated with the type of the relevant laundry and the decontamination method. Thus, an appropriate decontamination method may be output as voice from the washing machine 100.

Alternatively, for another example, when the user utters a type of laundry type, such as "underwear, pants, or baby clothes" while placing laundry therein, a customized laundry course may be set correspondingly while recognizing the uttered laundry in order, so as to output it with voice feedback prior to the initiation of washing.

Figure 4:
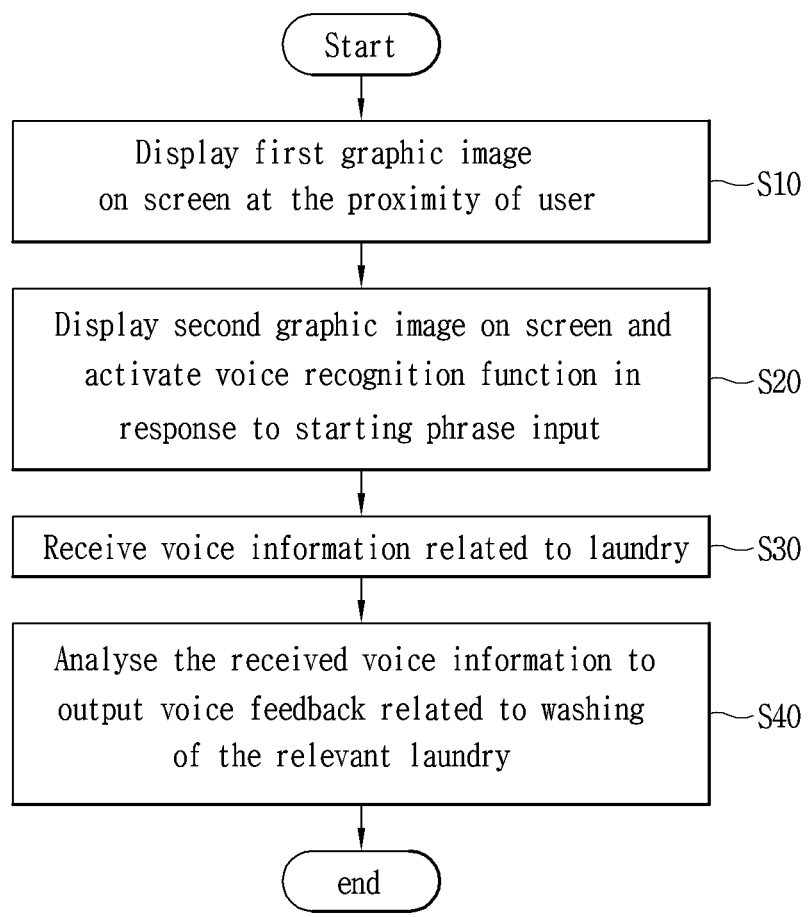
FIG. 4 is a representative flowchart for explaining the operation of a washing machine according to an embodiment of the present disclosure.

Hereinafter, FIG. 4 is a representative flowchart for explaining the operation of a washing machine according to an embodiment of the present disclosure.

Referring to FIG. 4, first, a first graphic image is displayed on the touch screen 122 in response to sensing that the user approaches the main body of the washing machine within a reference range (S10). For the first graphic image, moving animation images, for example, graphic images 501, 502 such as blinking an LED, may be displayed while the touch screen 122 that has been turned off is turned on, as illustrated in FIG. 5A. At this time, when it is sensed that the user is farther away from the washing machine 100 above a reference range through the proximity sensor, the touch screen 122 may be turned off again while displaying the animation images of FIG. 5A in reverse order.

When the first graphic object is displayed in a power-off state of the washing machine 100, the washing machine 100 is now in a listening state/standby state. In the standby state, the voice receiver 135 of the washing machine 100 continuously monitors whether sound above a specific loudness is sensed through a microphone, for example.

On the other hand, when there is no starting phrase input or the user moves away from the washing machine 100 until a reference time elapses subsequent to the output of the first graphic image, the washing machine 100 is switched back to the power-off state or sleep mode.

Subsequent to the output of the first graphic image, when a starting phrase is received within a predetermined time period, a voice recognition function is activated to display a second graphic image indicating it on the touch screen 122 (S20). Then, connection to the server 300 (see FIG. 2) linked according to the starting phrase input is activated.

Here, the starting phrase is a control command for starting a voice analysis, and may be set to various words for each device. For example, the start phrase may be set as "Hello, washer", and the like, but is not limited thereto, and may be modified in various ways. The control unit 180 may start a voice analysis on voice uttered subsequent to such a starting phrase. That is, the voice recognition function of the washing machine 100 is switched to an execution state according to the input of the starting phrase.

The second graphic image may be an image including information on a registered user as illustrated in FIG. 5B. To this end, while the second graphic image is being displayed, the control unit 180 may analyze the voice of the user who inputs the starting phrase to generate response voice including matching user information. For example, as illustrated in FIG. 5B, text such as "Hello! Esther" may be displayed on the touch screen 122 while at the same time outputting voice.

In addition, although not shown, in an example, when the response voice (e.g., "Hello! Esther") is output, the second graphic object may be converted into a third graphic object corresponding to a washing-related function. Here, the third graphic object corresponding to a washing-related function may be an initial washing screen including various menus and time information for setting a washing course.

The control unit 180 may analyze voice information, using a voice recognition algorithm, for the voice information received after the starting phrase. In addition, the control unit 180 may control the operation of the washing machine 100 according to a voice command corresponding to voice information based on the analysis result. Alternatively, the voice analysis may be performed through the execution of a separate application installed in the external terminal 200 that is paired with or in wireless communication with the washing machine 100.

When the voice recognition function is activated as described above, voice information related to laundry may be received from the user (S30).

On the other hand, in one embodiment, the voice information related to laundry may be limited to user voice received while the opened state of the washing machine door is maintained or until the closed state of the washing machine door is sensed. According to this, even when the user's voice information is omitted, a search range ("laundry") may be clearly limited, thereby providing more accurate and specific voice feedback. However, even in such a case, it is not meant to ignore voice information being received later, but it should be understood as recognizing it as normal voice information to process the corresponding command.

Next, the received voice information is analyzed to output voice feedback related to washing of the relevant laundry (S40). The control unit 180 may additionally output text information that is the same as or related to voice feedback through the touch screen 122 while the voice feedback is being output.

In addition, the control unit 180 of the washing machine 100 may transmit voice information related to laundry to the aforementioned server or another artificial intelligence server to process the voice information analyzed through an artificial intelligence algorithm. Here, the server or the artificial intelligence server denotes a server that provides a function of learning a large amount of information using an artificial intelligence algorithm and deriving optimal result information based on the learned information. Alternatively, in another example, the control unit 180 of the washing machine 100 may have its own artificial intelligence algorithm and generate feedback information related to washing of laundry based on the stored data.

In one embodiment, the third graphic object may be output while voice information is received from the user, and a fourth graphic object different from the third graphic object may be output while the washing machine 100 outputs feedback voice. Accordingly, it may be possible to visually confirm the subject of the uttered voice.

In addition, as an example, while the control unit 180 analyzes the received voice information, dynamic images 604a, 604b repeatedly moving in left and right directions as illustrated in FIG. 6D may be continuously output on the touch screen 122.

Furthermore, in one embodiment, the voice receiver may be switched to the standby mode while the feedback voice related to washing of laundry is output. In addition, in order to prevent the user from uttering at the same time while the washing machine 100 utters, as shown in FIGS. 5B, 6B, and 6C, a designated indicator, for example, a microphone off display image 510 may be displayed in one region of the touch screen 122.

Furthermore, even when feedback voice is being output, the control unit 180 may stop outputting the feedback voice when voice information is received from the user. At this time, when previous voice information matching feedback voice whose output is interrupted and voice information being input later are inconsistent, feedback voice changed based on the voice information being input later is generated. In this case, the changed feedback voice may further include query information for requesting confirmation from the user in order to determine that the voice information being input later conforms to the user's intention.

Figure 6A:
Figure 6B:
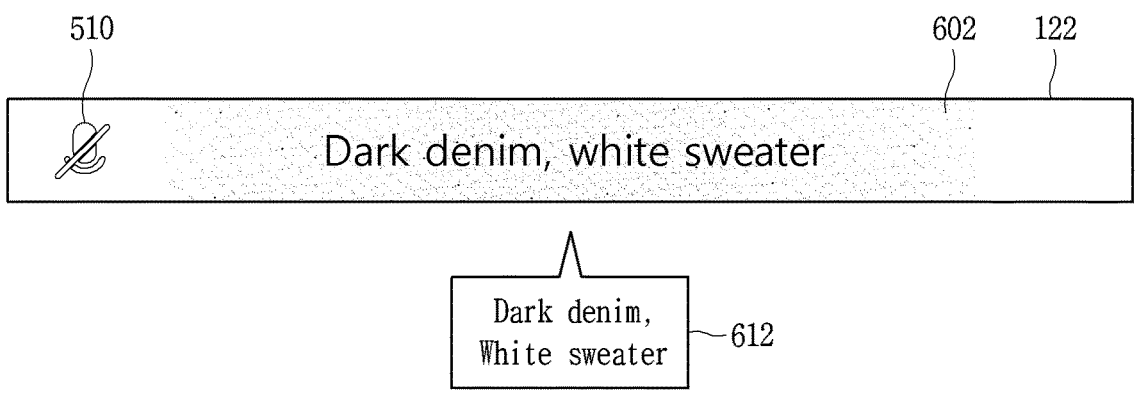
Figure 6C:
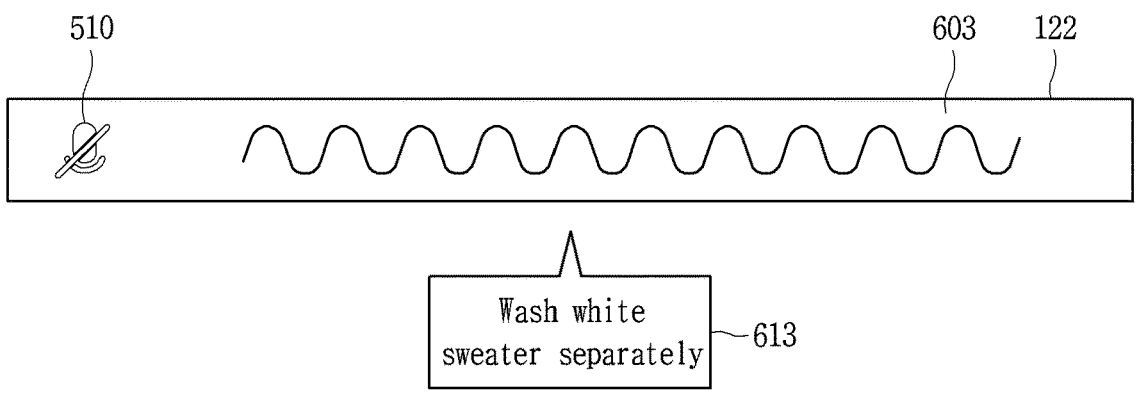

In addition, when the user's voice is received while the washing machine 100 utters, the indicator 510 illustrated in FIGS. 5B, 6B, and 6C that has been output on the touch screen 122 immediately disappears. Accordingly, it is intuitive that the washing machine has been switched to a state capable of analyzing voice information.

FIGS. 6A through 6C illustrate a specific example of feedback on voice information related to laundry. Referring to FIG. 6A, while placing laundry into the washing machine 100, voice information regarding the type of laundry (e.g., "Here are a dark denim and a white sweater") 611 may be received. At this time, the third graphic object 601 indicating that the user's voice is listening may be displayed on the touch screen 122 of the washing machine 100.

On the other hand, when the start of laundry included in the received voice information exceeds a predetermined number (e.g., 5), the control unit 180 may recognize the laundry by only the predetermined number to output the recognition result through voice as well as to additionally output voice asking to utter by cutting to less than the predetermined number or an intermediate answer (e.g., OK, anything else?').

In response to receiving the voice information including the type of laundry, the control unit 180 extracts the type of laundry as a keyword ("dark denim" or "white sweater"). Then, while outputting the extracted keywords as voice as illustrated in FIG. 6B (612), the control unit 180 also displays the keywords in the form of dictation on the touch screen 122 (602). As an exception, when a dictation mute function is being executed, extracted keywords may be displayed only on the touch screen 122.

While the extracted keywords being output, the voice receiver 135 enters a standby state for a while, and the indicator 510 indicating the state appears on the touch screen. When voice information is additionally received from the user (e.g., "No! It's white cotton T-shirt".) while only some of the keywords are output, the control unit 180 immediately stops dictation and voice output, and when the user's utterance ends, the changed dictation and voice output are subsequently output based on the voice information being input later.

Furthermore, the control unit 180 may also receive laundry-related information matching the extracted keywords from the linked server 300. For example, handling precautions for the "sweater" from the server 300 may be received and combined with voice information uttered by the user to generate feedback information regarding washing of laundry.

In addition, the control unit 180 may determine whether the relevant laundry is laundry to be separately washed based on the analysis of voice information related to laundry received at a first time point and voice information received at a second time point after the elapse of the first time point, and output different voice feedback according to the determination. Here, the first time point and the second time point may include not only a case where a plurality of voice information are received with a time difference, but also a plurality of time points/sections separated from single voice information.

For example, in FIG. 6A, "a dark denim and a white sweater" are included in single voice information, but "dark denim" is uttered at the first time point and "white sweater" is uttered at the second time point. Subsequently, referring to FIG. 6C, the control unit 180 may determine that the "dark denim" that has been input at the first time point and the "white sweater" that has been input at the second time point cannot be washed together and thus must be washed separately. Accordingly, voice feedback such as "Please wash the white sweater separately" may be output. As described above, a fourth graphic object indicating that the washing machine is uttering may be displayed on the touch screen 122 while outputting the voice feedback.

When the user does not utter the next voice information for a reference time, the control unit 180 may query whether there is no more laundry to be added.

Then, when an affirmative response is received from the user or an operation related to the start of washing is sensed, the control unit 180 automatically sets an optimal washing course based on the type and amount of laundry recognized through voice. To this end, the control unit 180 presets the individual cycles of a washing course based on the analysis of voice information related to laundry, and outputs feedback voice informing the set individual cycles in response to the input of a washing start command, and then proceeds washing.

As described above, according to the present disclosure, in consideration of the characteristics of the washing machine in which the user should directly place laundry, direct and specific interactions related to the laundry are possible while placing the laundry therein. Moreover, an optimal laundry course may be automatically set based on voice interactions associated with laundry, and upon receiving a washing start input, washing may be quickly started with the optimal laundry course.

Hereinafter, with reference to FIGS. 7A, 7B, 7C, 7D, and 7E, an example of a method of registering a washing machine using an external terminal for voice interaction in a washing machine according to an embodiment of the present disclosure will be described in detail.

In order to perform a voice interaction according to the present disclosure, the washing machine 100 must be registered with the server 300, and for this purpose, after installing a specific application on the mobile terminal 200, information on the washing machine 100 must be read and sent to the server 300.

The information related to the washing machine 100 includes a unique device ID and product characteristic information. In addition, a user ID and password may be additionally included therein. In addition, the product characteristic information may include the model information, product code, manufacturing date, serial number, and the like of the washing machine.

Figure 7A:
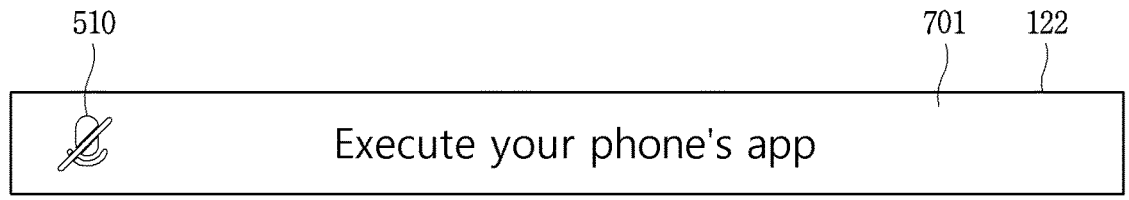
FIGS. 7A, 7B, 7C, 7D, and 7E are conceptual views illustrating an exemplary method of registering a washing machine using an external terminal for a voice interaction in a washing machine according to an embodiment of the present disclosure.

When the washing machine 100 is not registered with the server or as an initial screen for installation, as illustrated in FIG. 7A, screen information 701 for guiding a predetermined application to be installed on the external terminal 200 to be paired with the washing machine 100 may be displayed together with a predetermined indicator 510 on the touch screen 122.

Figure 7B:
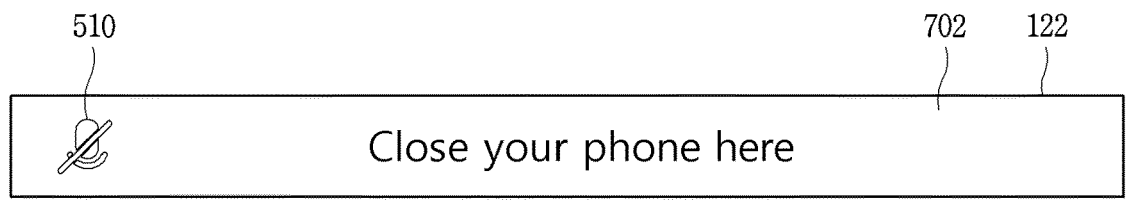
Figure 7C:
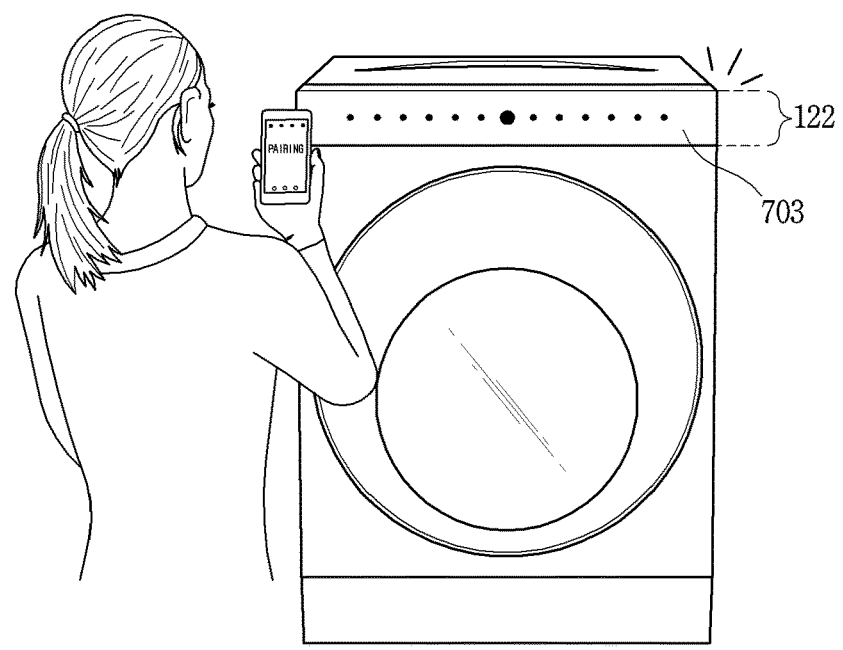

When a specific application is installed in the external terminal 200, the control unit 180 performs a process of displaying screen information 702 for guiding the external terminal 200 to approach the main body or the touch screen 122 of the washing machine 100 as illustrated in FIG. 7B. When the external terminal 200 is brought in proximity to the washing machine 100, an image object 703 indicating pairing to the touch screen 122 of the washing machine 100 and the touch screen of the external terminal 200, respectively, is displayed while being paired.

Figure 7D:
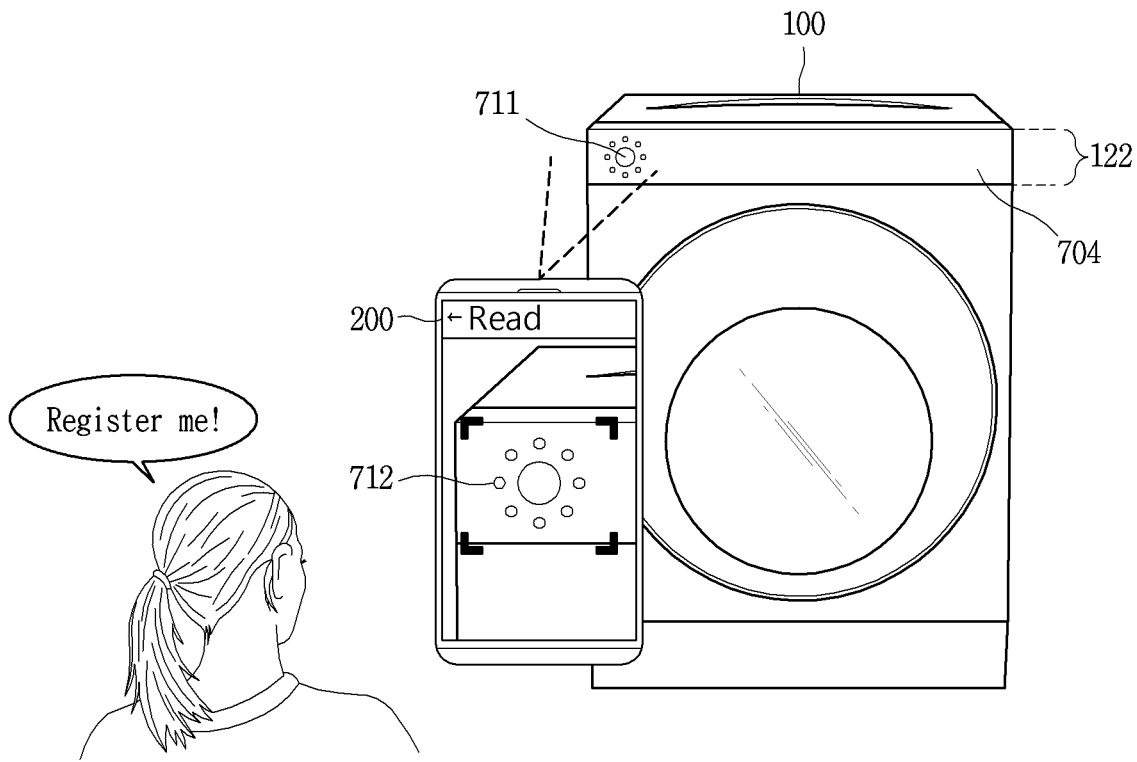

Referring to FIG. 7D, as a method of reading information on the washing machine 100, that is, a unique device ID and product characteristic information from the external terminal 200, a unique pattern dynamic image 711 including the relevant device ID and product characteristic information may be displayed on the touch screen 122 of the washing machine 100, and the external terminal 200 may capture it to recognize the relevant device ID and product characteristic information by itself based on the captured image 712 or transmit them to the server 300 connected through an application.

On the other hand, it may be of course possible to read a graphic pattern, an animation, a specific sound, a QR code, or the like, as well as the dynamic image 711 or read information on the washing machine 100 through other various methods.

At this time, product registration to the server 300 may be finally completed by the user uttering voice such as "Register me" or by applying a predetermined input to the external terminal 200. The server 300 authenticates the received information, and then transmits its own ID and location information to the external terminal 200 and the washing machine 100 when registration is possible. From then on, the server 300 may recognize the washing machine related information, AP information, and user information connected to the server 300, and continuously learn by collecting data related to the operation of the washing machine.

Figure 7E:
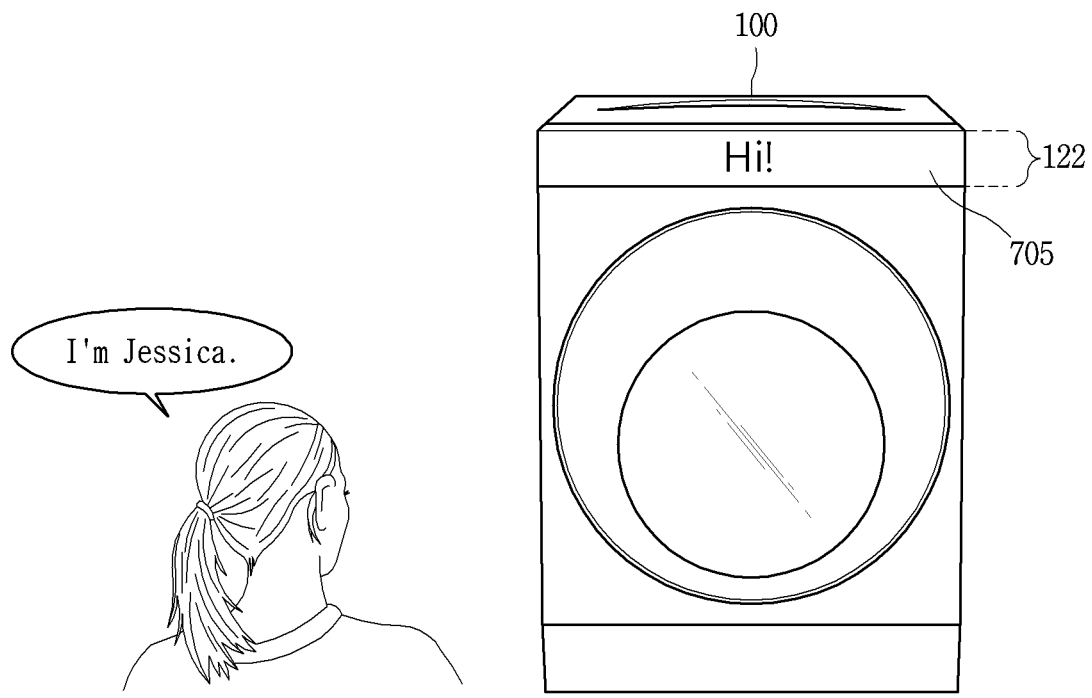

FIG. 7E is an example of a method of additionally registering a user matching the registered washing machine 100. When uttering the name ("Jessica") to be registered subsequent to entering the setting for user registration, the control unit 180 confirms the voice recognition and text name of the received voice information by matching them, and performs registration based on a user response. After the user voice is registered as described above, the matched user name may be uttered in response to the input of the starting phrase. Alternatively, the user's name may be queried in the form of a conversation (e.g., "What's your name?") and stored with the recognized voice.

As described above, when the registration of the washing machine 100 and the user voice registration are completed, feedback voice indicating that the setting has been successfully performed is finally output.

FIGS. 8A, 8B, 8C, 8D, and 8E show still another exemplary screen of a process of sorting laundry and selecting a laundry course.

Figure 8A:
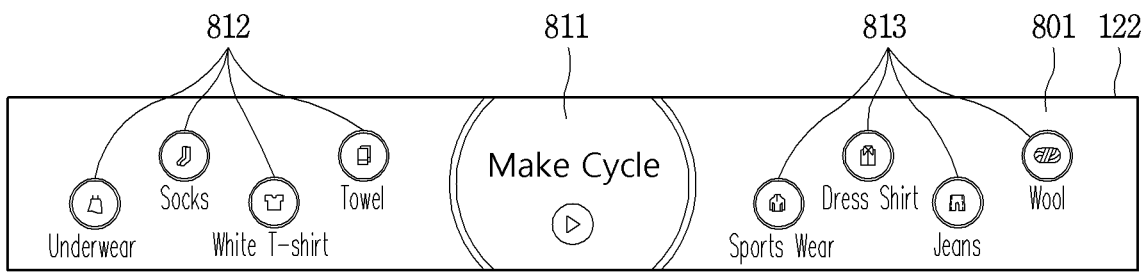
FIGS. 8A, 8B, 8C, 8D, and 8E are views illustrating an exemplary screen of a process of sorting laundry and selecting a laundry course in a washing machine according to an embodiment of the present disclosure.

Referring to FIG. 8A, while placing laundry therein, screen information 801 displayed with a plurality of icons 812, 813 corresponding to different types of laundry may be displayed on the touch screen 122. The plurality of icons 812, 813 may display information regarding the types and characteristics of laundry, and the control unit 180 recognizes that laundry corresponding to the selected icon between the displayed icons 812, 813 is placed in the washing tub.

Figure 8B:
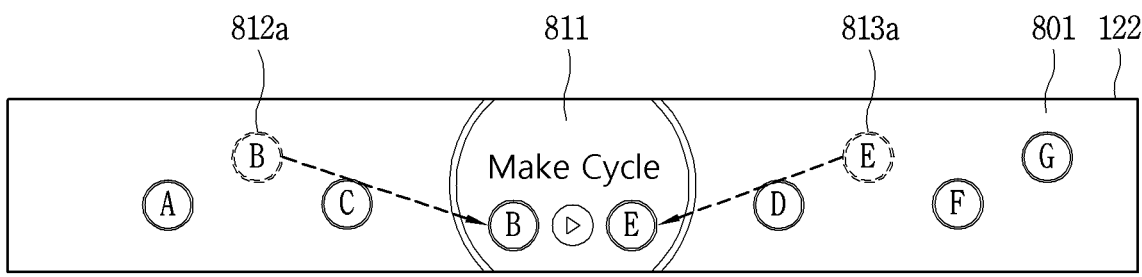

Here, the selected icons 812*a*, 813*a* are moved to a predetermined region, for example, a "Make Cycle display region" as illustrated in FIG. 8B. In addition, the selection of icons may be replaced with or performed in parallel with a touch input in addition to the voice-based operation.

For an example, the control unit 180 recognizes the type of laundry corresponding to the touched icon in response to a touch applied to at least one of the plurality of icons being dragged to a predetermined region 811 of the touch screen 122. Next, the control unit 180 changes the individual cycles of the washing course correspondingly, including the recognized type of laundry.

Alternatively, the control unit 180 may drag a touch applied to the icon to the predetermined region 811 to additionally input the type of laundry to be washed.

Figure 8C:
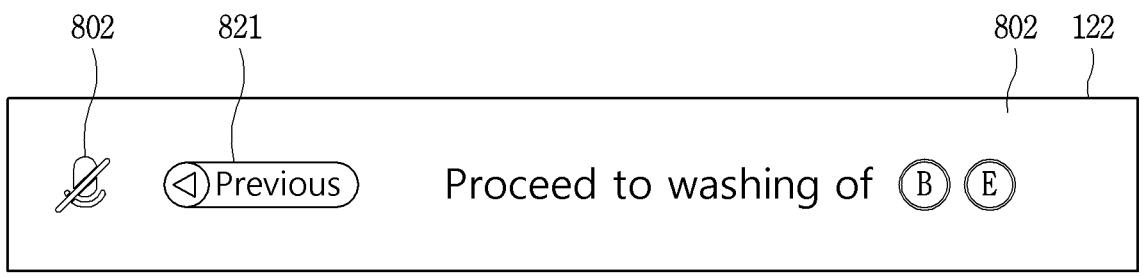
Figure 8D:
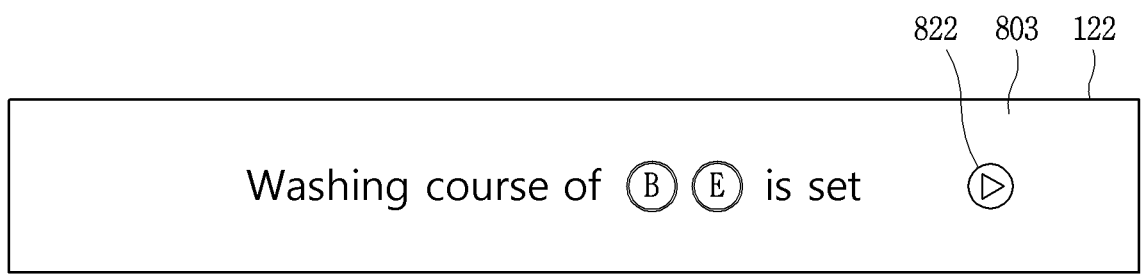
Figure 8E:
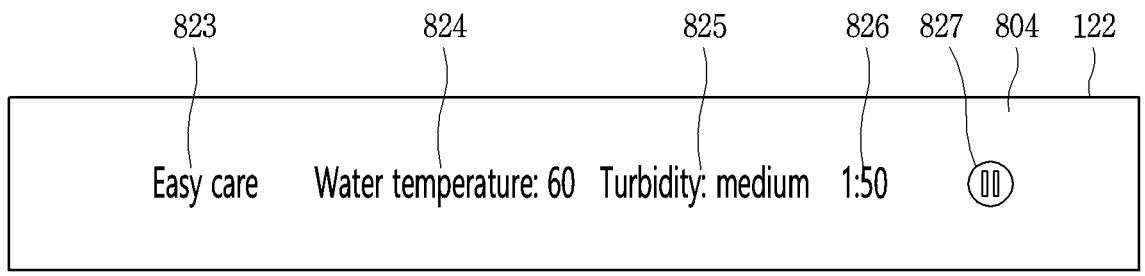

When the loading of laundry is completed, screen information 802 and voice information for checking the loaded laundry may be output as shown in FIG. 8C, and the user may additionally recognize the laundry by answering affirmatively or selecting the previous menu 821. Then, as illustrated in FIG. 8D, screen information 803 indicating that a washing course is set according to laundry recognized as being added is displayed. When a washing start icon 822 is selected from the screen information 803 or a predetermined time period (e.g., 3 seconds) has elapsed, screen information 804 confirming the set washing course cycle as shown in FIG. 8E is displayed on the touch screen 122.

When any one of the laundry course cycles 823, 824, 825, 826 included in the displayed screen information 804 is touched, the touched cycle may be selectively changed. Alternatively, washing start may be stopped by touching a washing stop icon 827.

Meanwhile, in one embodiment, when the received user's voice information is in the form of a query, for example, when the voice information related to laundry is information in the form of a query about the type or contamination of laundry, the control unit 180 may trigger to capture a laundry image using the camera 136 provided in the washing machine 100 or the connected external terminal. Here, the trigger may be a guide prompt indicating that capturing is ready.

In addition, the control unit 180 may transmit the captured laundry image to the server 300 to obtain information related to washing of the laundry, for example, a type of the captured laundry, a method of removing contamination, and output voice feedback.

FIG. 9 is an exemplary flowchart for explaining a process of providing a different feedback according to an analysis of received voice information in a washing machine according to an embodiment of the present disclosure and in a washing machine.

Referring to FIG. 9, a voice recognition function of the washing machine is activated based on a starting phrase input or a preset type of user input (S901). Then, while placing laundry therein, voice information related to the laundry is received (S902).

The control unit 180 of the washing machine analyzes the received voice information (S903), and determines whether it is voice information related to the type of laundry (S904). This is to limit the scope of search and provide an accurate and specific response at once.

When the voice information is related to the type of laundry as a result of determination, voice feedback related to the classification of the laundry is output (S905). On the contrary, when it is not voice information related to the type of laundry, it is further determined whether it is voice information related to a degree of contamination of laundry (S906).

When it is voice information related to the degree of contamination of laundry, voice feedback related to the changed cycle of the laundry course is output (S907), and the changed cycle is set based on a subsequent user input (S908).

On the other hand, when it is not voice information related to the degree of contamination of laundry in step S906, feedback information is displayed on the touch screen 122 (S909). Here, multiple feedback information may be presented to allow the user to select through a touch input.

Next, when the closing of the washing machine door is sensed (S910), voice corresponding to the set optimal washing course is output (S911), and washing is started accordingly.

Specifically, when the closing of the washing machine door is sensed, the control unit 180 sequentially outputs first voice that guides the set washing cycle and second voice that informs that washing is started with the set washing cycle based on voice information related to laundry.

On the other hand, when the closing of the washing machine door is sensed, third voice may be further output to check whether there is no laundry to be additionally placed therein before outputting the first voice. At this time, when there is an affirmative response from the user, the washing machine door may be automatically opened or unlocked to place laundry therein.

In addition, when the closing of the washing machine door is sensed while feedback voice related to washing of laundry is output, the control unit 180 may immediately stop outputting the feedback voice and output the first voice. As a result, a fast washing process suitable for the user's intention is implemented.

Figure 10A:
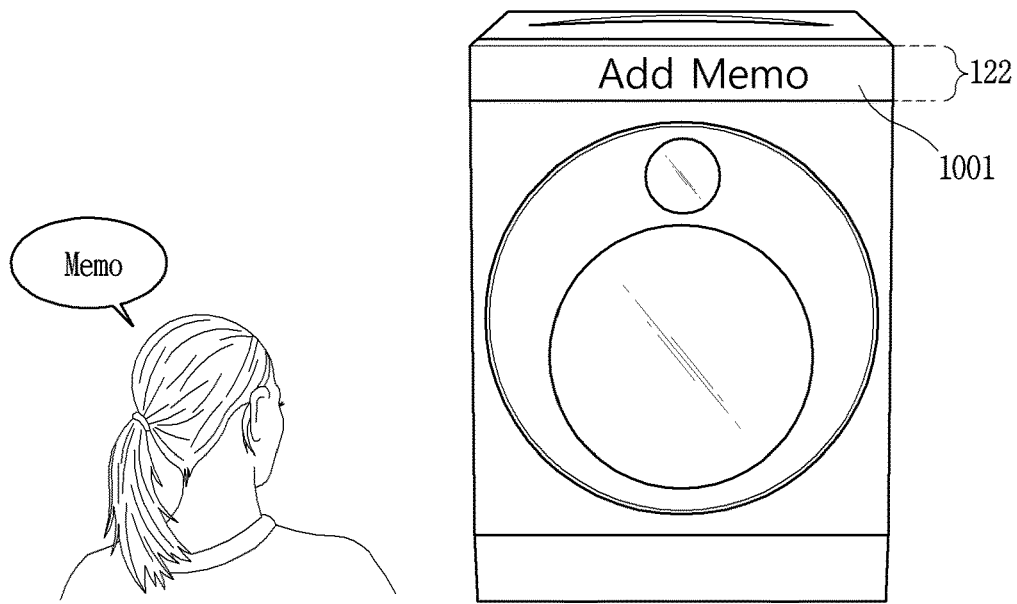
FIGS. 10A through 10C are exemplary conceptual views for explaining a method of providing a voice memo subsequent to the completion of washing in a washing machine according to an embodiment of the present disclosure.
Figure 10B:
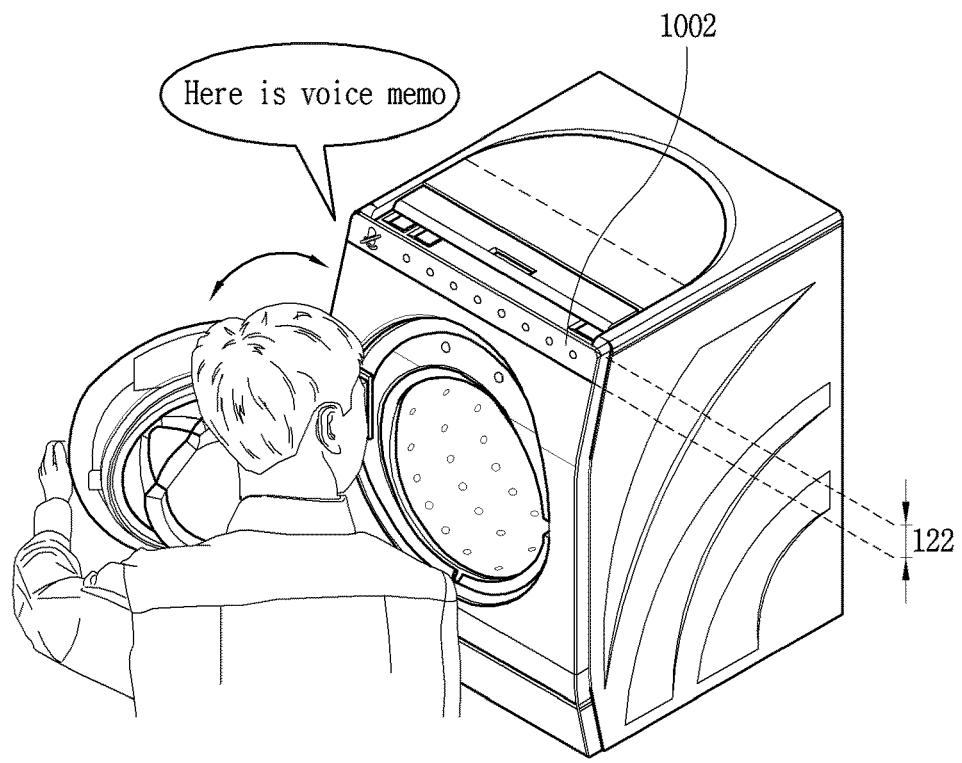
Figure 10C:
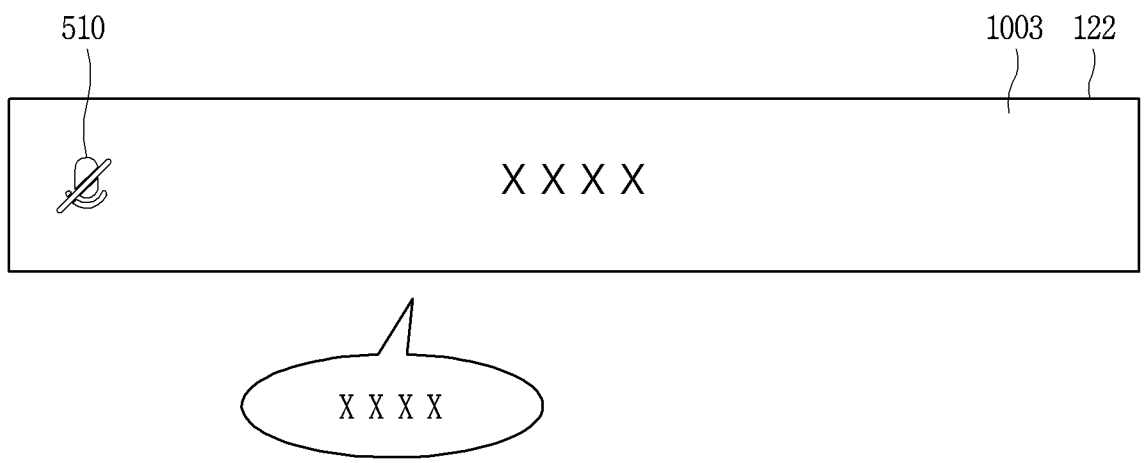

Next, FIGS. 10A through 10C show a method of providing a voice memo subsequent to the completion of washing. To this end, the washing machine 100 according to the present disclosure includes a memory 195 for storing the input voice memo while washing is in progress.

Referring first to FIG. 10A, at any stage of washing of the user's washing machine 100, a voice memo function may be executed by uttering predetermined voice (e.g., "memo"). Accordingly, information (e.g., "Add Memo") 1001 is displayed on the touch screen 122 to guide the activation of a voice memo function and the input of a voice memo.

Then, the control unit 180 may output a voice memo stored in the memory 195 in the form of a voice prompt in response to sensing the opening of the washing machine door as shown in FIG. 10B subsequent to the completion of washing. Prior to this, a prompt such as have a voice memo" may be output first. Then, the stored voice memo is output while at the same time it is also provided in the form of dictation on the touch screen 122 as shown in FIG. 10C (1003). For example, in case where user A leaves a voice memo saying "Remove the socks and dry the rest of the laundry" during the washing of the washing machine 100, when user B opens the washing machine door subsequent to the completion of washing, the stored voice memo is output as voice. Accordingly, a more efficient and intelligent washing may be performed.

On the other hand, in one example, it is also possible to set the output of the voice memo to be output only when a specific user approaches. To this end, upon an input of a voice memo, it may be implemented to output the voice memo only when the name of the registered user B is uttered together with the voice memo, and the registered user B utters a starting phrase or another voice, and limit the output of the voice memo when another user C opens or closes the door.

For another example of the present disclosure, FIG. 11 is an exemplary flowchart for explaining processing when a plurality of voice information having different washing steps is received.

Referring to FIG. 11, a voice recognition function of the washing machine is activated based on a starting phrase input or a preset type of user input (S1101). Next, a plurality of voice information related to a washing course is received (S1102). At this time, the step of washing course and the degree of washing progress at a time point when a plurality of voice information are received are not an obstacle. However, for determination in the following steps, it is required to recognize a process of recognizing the current washing course step.

As a result of analysis of the received voice information, the control unit 180 determines whether a command for an upper/lower washing cycle of the current washing course is included therein (S1103). At this time, a case where only part of the plurality of voice information is a command for the upper/lower washing cycle of the current washing course is also included therein.

When the received plurality of voice information are all related to the current washing course or can be answered irrespective of the current washing course, washing continues while outputting voice feedback corresponding to the analysis of the received voice information (S1104).

On the other hand, when at least part of the plurality of voice information is a command for the upper/lower washing cycle of the current washing course, feedback information corresponding to the upper/lower washing cycle is stored (S1105). At this time, information of the washing cycle matching the stored feedback information is also stored.

Then, voice feedback corresponding to the analysis of the received voice information is output (S1106). In one embodiment, even when only voice feedback is provided for part of the plurality of voice information, voice for guiding that other stored feedback information will be output may be additionally output.

Then, when entering a washing cycle matching the stored information of the washing cycle is sensed, the stored feedback information is output as voice (S1107) to execute a function corresponding thereto. Accordingly, even when a user's voice command related to the current washing course is input, it is remembered to automatically execute a function when entering the relevant washing course or when laundry is taken out.

As described above, according to a washing machine and an operation method of the washing machine in accordance with an embodiment of the present disclosure, a voice interaction related to laundry may be performed while placing the laundry therein, in consideration of the characteristics of the washing machine in which the laundry must be directly placed by a user. Furthermore, an optimal laundry course may be automatically set based on a voice interaction related to laundry to perform the initiation of washing more quickly. In addition, a washing machine and an operation method thereof capable of remembering a user's voice even when the voice command is input regardless of the progress of a current washing course, and then automatically executing a function when entering the relevant washing course or taking out laundry.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the control unit 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A washing machine, comprising:
    a washing tub;
    a voice sensor configured to receive voice information;
    a touch screen configured to output one or more graphic objects corresponding to a washing-related function executable by the washing tub; and
    a controller configured to:
        sense a proximity between a user and the washing machine, display a first graphic object on the touch screen based on the proximity between the user and the washing machine,
        activate a voice recognition function in response to recognizing the voice information corresponding to a starting phrase,
        control the touch screen to switch the first graphic object to a second graphic object indicating that the voice recognition function is activated,
        based on the voice information, recognize that the starting phrase corresponds to the user, generate a response sound matching user information corresponding to the user, and output the response sound,
        based on the voice recognition function being activated, recognize that the voice information relates to laundry, and
        output a feedback sound related to washing of the laundry based on recognizing that the voice information relates to the laundry,
    wherein the controller is configured to switch the second graphic object to a third graphic object corresponding to the washing-related function while outputting the response sound.

2. The washing machine of claim 1, wherein the voice information comprises input information or inquiry information that is related to at least one of a type of the laundry, a degree of contamination of the laundry, a washing method for the laundry, or a decontamination method of the laundry, and
    wherein the feedback sound comprises answer information that is related to at least one of whether the laundry is to be separately washed from other clothes, the washing method, a handling precaution for the laundry, whether to change a washing cycle according to the degree of contamination, or the decontamination method.

3. The washing machine of claim 1, wherein the controller is configured to:
    switch the voice sensor to a standby mode based on the feedback sound being output; and
    in response to receiving the voice information while the feedback sound is output, stop outputting the feedback sound and switch the voice sensor from the standby mode to an execution mode.

4. The washing machine of claim 1, wherein the controller is configured to:
    in response to receiving the voice information including a type of laundry, recognize a keyword from the voice information corresponding to the type of laundry, and
    display a dictation of the keyword on the touch screen while outputting a sound corresponding to the keyword.

5. The washing machine of claim 4, wherein the controller is configured to:
    receive, from a server, laundry-related information matching the keyword; and
    generate feedback information related to washing of the laundry based on the laundry-related information from the server and the voice information from the user.

6. The washing machine of claim 1, wherein the controller is configured to:
- receive first voice information related to a first type of laundry at a first time point;
- receive second voice information related to a second type of laundry at a second time point;
- determine whether the first type of laundry and the second type of laundry are suitable to be separately washed; and
- output the feedback sound according to a determination whether the first type of laundry and the second type of laundry are suitable to be separately washed.

7. The washing machine of claim 1, wherein the controller is configured to:
- set a plurality of washing cycles based on the voice information related to the laundry, and
- output a feedback voice indicating each of the plurality of washing cycles based on input of a washing start command.

8. The washing machine of claim 7, wherein the controller is configured to:
- display a plurality of icons corresponding to different types of laundry on the touch screen;
- receive touch input on the touch screen;
- determine a type of laundry corresponding to one of the plurality of icons based on the touch input being applied to the one of the plurality of icons and being dragged to a predetermined region of the touch screen; and
- change one or more of the plurality of washing cycles according to the type of laundry corresponding to the one of the plurality of icons.

9. The washing machine of claim 1, wherein the controller is configured to:
- based on a determination that the voice information includes a query about a type of the laundry or a contamination of the laundry, obtain a laundry image of the laundry through a camera disposed at the washing machine or an external terminal connected to the washing machine; and
- transmit the laundry image to a server and receive information related to washing of the laundry corresponding to the laundry image.

10. The washing machine of claim 1, wherein the controller is configured to:
- determine a degree of contamination of the laundry based on the voice information related to the laundry; and
- output the feedback sound related to a change of a washing cycle based on the degree of contamination.

11. The washing machine of claim 10, wherein the controller is configured to:
- generate a washing start command to perform the changed washing cycle based on a response of the user to the feedback sound.

12. The washing machine of claim 1, wherein the controller is configured to:
- set a washing cycle based on the voice information related to the laundry; and
- based on detecting that the washing tub is closed, sequentially output a first voice indicating the washing cycle and a second voice indicating a start of the washing cycle.

13. The washing machine of claim 12, wherein the controller is configured to:
- based on detecting the washing tub is closed while the feedback sound is output, stop outputting the feedback sound and output the first voice.

14. The washing machine of claim 1, further comprising:
- a non-transitory memory configured to store a voice memo that is input during an operation of the washing machine,
- wherein the controller is configured to output the voice memo in response to detecting the washing tub is opened subsequent to a completion of the operation of the washing machine.

15. The washing machine of claim 1, wherein the feedback sound comprises a voice generated by the controller.

16. The washing machine of claim 1, wherein the starting phrase comprises one or more words that are predetermined to indicate a control command for activating the voice recognition function.

17. The washing machine of claim 1, further comprising a speaker,
- wherein the controller is configured to output the feedback sound through the speaker.

18. The washing machine of claim 1, further comprising a proximity sensor,
- wherein the controller is configured to sense the proximity between the user and the washing machine through the proximity sensor.

19. A method for operating a washing machine including a touch screen, the method comprising:
- sensing a proximity between a user and the washing machine;
- based on the proximity between the user and the washing machine, displaying a first graphic object on the touch screen;
- receiving voice information from the user;
- based on recognizing that the voice information includes a starting phrase, activating a voice recognition function;
- displaying a second graphic object indicating that the voice recognition function is activated;
- based on the voice information, recognizing that the starting phrase corresponds to the user, generating a response sound matching user information corresponding to the user, and outputting the response sound;
- connecting to a server and receiving washing-related information;
- based on recognizing that the voice information relates to laundry, outputting a feedback sound related to washing of the laundry; and
- switching the second graphic object to a third graphic object corresponding to a washing-related function executable by a washing tub of the washing machine while outputting the response sound.

* * * * *